US009609015B2

(12) United States Patent
Natarajan et al.

(10) Patent No.: US 9,609,015 B2
(45) Date of Patent: Mar. 28, 2017

(54) SYSTEMS AND METHODS FOR DYNAMIC CLOUD-BASED MALWARE BEHAVIOR ANALYSIS

(71) Applicants: Sriram Natarajan, Norcross, GA (US); Narinder Paul, Sunnyvale, CA (US); Julien Sobrier, Campbell, CA (US); Karthikeyan Thamilarasu, Atlanta, GA (US); Balakrishna Bayar, Fremont, CA (US); Michael Andrew William Sutton, Reston, VA (US)

(72) Inventors: Sriram Natarajan, Norcross, GA (US); Narinder Paul, Sunnyvale, CA (US); Julien Sobrier, Campbell, CA (US); Karthikeyan Thamilarasu, Atlanta, GA (US); Balakrishna Bayar, Fremont, CA (US); Michael Andrew William Sutton, Reston, VA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 14/796,422

(22) Filed: Jul. 10, 2015

(65) Prior Publication Data
US 2015/0319182 A1 Nov. 5, 2015

Related U.S. Application Data

(63) Continuation-in-part of application No. 12/128,481, filed on May 28, 2008, now Pat. No. 8,887,249, and
(Continued)

(51) Int. Cl.
*H04L 29/06* (2006.01)
*G06F 21/56* (2013.01)
*G06F 21/53* (2013.01)

(52) U.S. Cl.
CPC ............ *H04L 63/145* (2013.01); *G06F 21/53* (2013.01); *G06F 21/566* (2013.01);
(Continued)

(58) Field of Classification Search
CPC ............. H04L 63/1441; H04L 63/1408; G06F 21/566; G06F 21/56; G06F 21/562
See application file for complete search history.

(56) References Cited

U.S. PATENT DOCUMENTS 7,062,680 B2 * 6/2006 Sirbu ...................... H04L 41/16
714/18
7,181,769 B1 * 2/2007 Keanini .............. H04L 63/1416
713/166

(Continued)

OTHER PUBLICATIONS

Anti-Malware Tools: Intrusion Detection Systems; Martin, Overton; IBM; Apr. 30-May 3, 2005.*

(Continued)

*Primary Examiner* — James Turchen
(74) *Attorney, Agent, or Firm* — Clements Bernard Walker PLLC; Lawrence A. Baratta, Jr.; Christopher L. Bernard

(57) ABSTRACT

A cloud-based method, a behavioral analysis system, and a cloud-based security system can include a plurality of nodes communicatively coupled to one or more users, wherein the plurality of nodes each perform inline monitoring for one of the one or more users for security comprising malware detection and preclusion; and a behavioral analysis system communicatively coupled to the plurality of nodes, wherein the behavioral analysis system performs offline analysis for any suspicious content from the one or more users which is flagged by the plurality of nodes; wherein the plurality of nodes each comprise a set of known malware signatures for the inline monitoring that is periodically updated by the
(Continued)

behavioral analysis system based on the offline analysis for the suspicious content.

16 Claims, 27 Drawing Sheets

Related U.S. Application Data a continuation-in-part of application No. 12/354,900, filed on Jan. 16, 2009, now Pat. No. 9,154,475, and a continuation of application No. 14/225,557, filed on Mar. 26, 2014, now Pat. No. 9,152,789.

(52) U.S. Cl.
CPC ........ *H04L 63/0218* (2013.01); *H04L 63/083* (2013.01); *H04L 63/1408* (2013.01); *H04L 63/1458* (2013.01); *G06F 2221/03* (2013.01)

(56) References Cited

U.S. PATENT DOCUMENTS

| | | | |
|---|---|---|---|
| 7,392,543 B2* | 6/2008 | Szor | H04L 63/1416 713/188 |
| 7,894,350 B2 | 2/2011 | Kailash et al. | |
| 7,899,849 B2 | 3/2011 | Chaudhry et al. | |
| 8,171,554 B2* | 5/2012 | Elovici | H04L 12/2602 713/151 |
| 8,181,245 B2* | 5/2012 | Tripathi | G06F 21/552 713/187 |
| 8,185,510 B2 | 5/2012 | Chaudhry et al. | |
| 8,347,386 B2* | 1/2013 | Mahaffey | G06F 21/564 726/23 |
| 8,365,259 B2 | 1/2013 | Chaudhry et al. | |
| 8,402,539 B1 | 3/2013 | Chen et al. | |
| 8,413,238 B1 | 4/2013 | Sutton | |
| 8,413,239 B2 | 4/2013 | Sutton et al. | |
| 8,453,234 B2* | 5/2013 | Dawson | H04L 12/2602 713/188 |
| 8,464,335 B1 | 6/2013 | Sinha et al. | |
| 8,478,708 B1 | 7/2013 | Larcom | |
| 8,484,726 B1 | 7/2013 | Sutton | |
| 8,510,838 B1 | 8/2013 | Sun et al. | |
| 8,549,581 B1 | 10/2013 | Kailash et al. | |
| 8,607,066 B1 | 12/2013 | Kailash et al. | |
| 8,667,593 B1* | 3/2014 | Shnitzer | H04L 63/1416 726/22 |
| 8,839,432 B1* | 9/2014 | Patil | G06F 21/566 713/188 |
| 8,863,288 B1* | 10/2014 | Savage | G06F 21/56 713/188 |
| 9,419,997 B2* | 8/2016 | Whitehouse | G06F 21/53 |
| 2005/0188272 A1* | 8/2005 | Bodorin | G06F 21/566 714/38.1 |
| 2006/0075500 A1 | 4/2006 | Bertman et al. | |
| 2007/0240217 A1* | 10/2007 | Tuvell | G06F 21/56 726/24 |
| 2007/0266421 A1* | 11/2007 | Vaidya | H04L 63/20 726/1 |
| 2008/0098478 A1* | 4/2008 | Vaidya | G06F 21/34 726/24 |
| 2008/0256636 A1* | 10/2008 | Gassoway | G06F 21/565 726/24 |
| 2008/0313734 A1* | 12/2008 | Rozenberg | H04L 63/1425 726/22 |
| 2009/0300045 A1* | 12/2009 | Chaudhry | G06F 21/552 |
| 2010/0031353 A1* | 2/2010 | Thomas | G06F 11/3604 726/22 |
| 2010/0095277 A1* | 4/2010 | Cheng | G06F 8/71 717/127 |
| 2012/0002839 A1* | 1/2012 | Niemela | G06K 9/00973 382/100 |
| 2012/0079596 A1* | 3/2012 | Thomas | G06F 21/55 726/24 |
| 2012/0304244 A1 | 11/2012 | Xie et al. | |
| 2013/0091571 A1 | 4/2013 | Lu et al. | |
| 2013/0111547 A1* | 5/2013 | Kraemer | G06F 21/552 726/1 |
| 2013/0239214 A1 | 9/2013 | Klein et al. | |
| 2013/0291087 A1 | 10/2013 | Kailash et al. | |
| 2013/0305357 A1* | 11/2013 | Ayyagari | H04L 63/14 726/22 |
| 2013/0333032 A1* | 12/2013 | Delatorre | H04L 63/1441 726/23 |
| 2013/0347094 A1* | 12/2013 | Bettini | H04L 63/0245 726/11 |
| 2014/0090059 A1* | 3/2014 | Wang | H04L 63/1416 726/23 |
| 2015/0096022 A1* | 4/2015 | Vincent | G06F 21/566 726/23 |

OTHER PUBLICATIONS

Elovici, Yuval, et al. "Applying machine learning techniques for detection of malicious code in network traffic." KI 2007: Advances in Artificial Intelligence. Springer Berlin Heidelberg, 2007. 44-50.*

Van Randwyk, Jamie, et al. "Farm: An automated malware analysis environment." Security Technology, 2008. ICCST 2008. 42nd Annual IEEE International Carnahan Conference on. IEEE, 2008.*

Xie, Peidai, et al. "iPanda: A comprehensive malware analysis tool."Information Networking (ICOIN), 2013 International Conference on. IEEE, 2013.*

Elovici et al., "Applying Machine Learning Techniques for Detection of Malicious Code in Network Traffic," KI 2007, LNAI 4667, pp. 44-50.

* cited by examiner

ACTIVITY

Lorem Ipsum dolor sit amet, consectetur adipiscing elit. Num et tincidunt est. Num posuere interdum dolor. Num et tincidunt est.

Process wmipryse.exe (PID 2808) ▸

Memory Activity : Memory Allocated ▸
Lorem ipsum dolor sit amet, consectetur adipiscing elit. Num et tincidunt est. Num posuere interdum dolor.

| Timestamp | PID | File Path | Size | Length | Source Address | Symbol | Protection |
|---|---|---|---|---|---|---|---|
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |
| 14:22:05.123 | 272 | C:\3ac54e0fBb44 1745cod6b2c26d5edfefe_ex... | 3408000 | 12FF14 | 4073BE | HeapCreate | Page read and write |

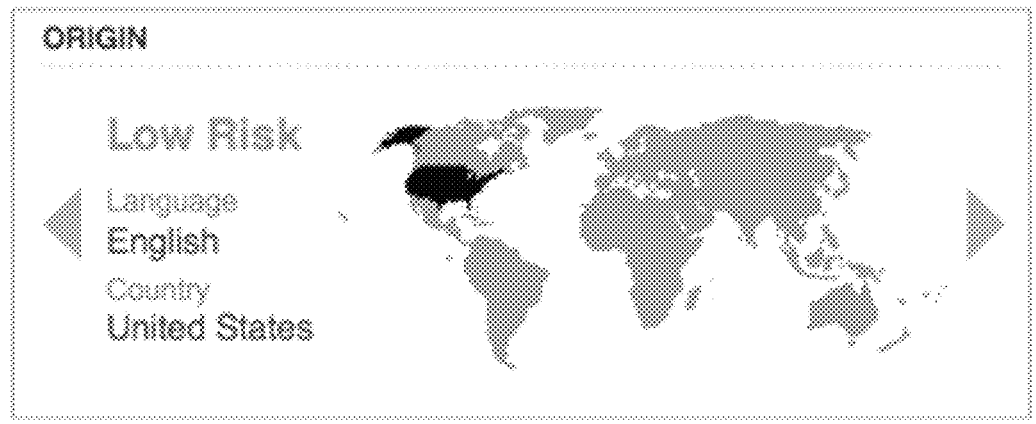
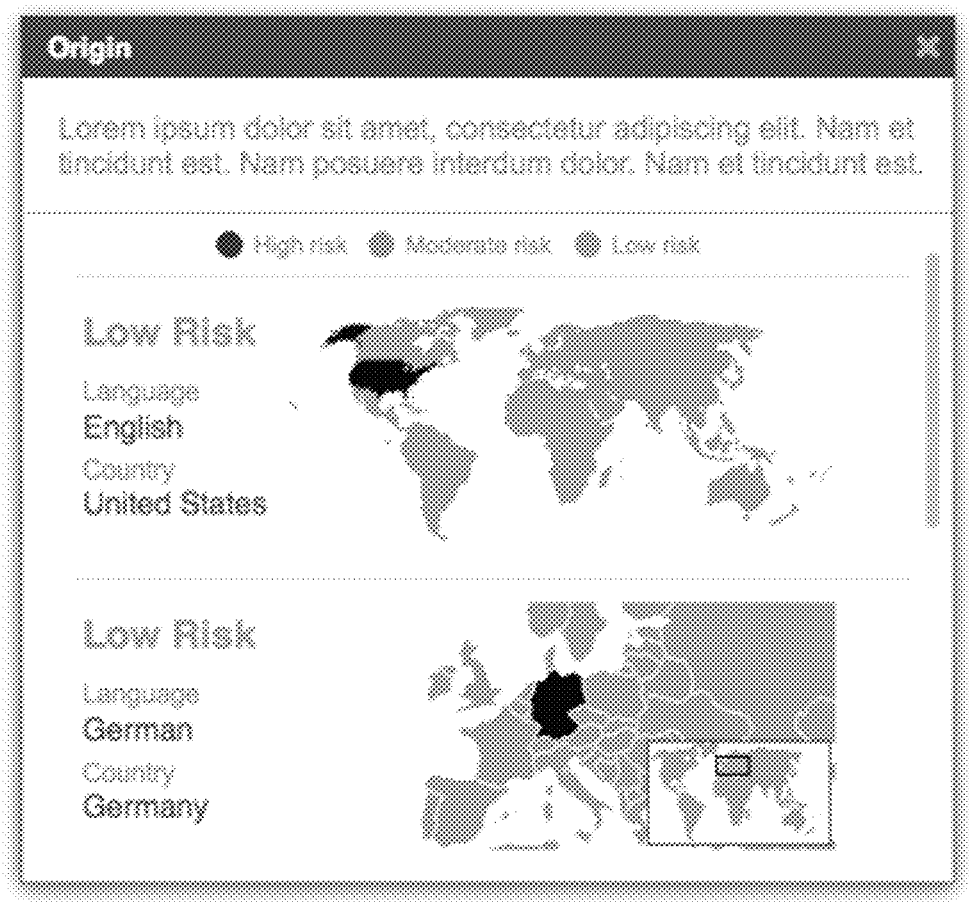
FIG. 20

NETWORK PACKETS

ALL | DNS | HTTP | TCP | UDP | ICMP | IRC | SMTP

| | |
|---|---|
| HTTP | GET /cmd/geo.php?mk=20130606221928937 |
| HTTP | 200 OK |
| DNS Q | xmlinstcp.eebvt.com |
| TCP | 124.30.4.107:80 ➔ 192.64.12.5:1008 |
| DNS A | 109.70.132.144 : xmlinstcp.eebvt.com |
| HTTP | GET /cmd/geo.php?mk=20130606221928937 |
| HTTP | 200 OK |
| TCP | 124.30.4.107:80 ➔ 192.64.12.5:1008 |
| TCP | 124.30.4.107:80 ➔ 192.64.12.5:1008 |

SYSTEMS AND METHODS FOR DYNAMIC CLOUD-BASED MALWARE BEHAVIOR ANALYSIS

CROSS-REFERENCE TO RELATED APPLICATIONS

This application is a continuation-in-part of the foregoing U.S. patent applications/patents, the contents of each are incorporated in full by reference herein.

| Filing Date | Serial No. | Title |
| --- | --- | --- |
| May 28, 2008 | 12/128,481 | PROTECTING AGAINST DENIAL OF SERVICE ATTACKS USING GUARD TABLES |
| Jan. 16, 2009 | 12/354,900 | USER AUTHENTICATION AND AUTHORIZATION IN DISTRIBUTED SECURITY SYSTEM |

This application is a continuation of the foregoing U.S. patent applications/patents, the contents of each are incorporated in full by reference herein.

| Filing Date | Ser. No. | Title |
| --- | --- | --- |
| Mar. 26, 2014 | 14/225,557 | SYSTEMS AND METHODS FOR DYNAMIC CLOUD-BASED MALWARE BEHAVIOR ANALYSIS |

FIELD OF THE DISCLOSURE

The present disclosure relates generally to computer networking systems and methods. More particularly, the present disclosure relates to systems and methods for dynamic cloud-based malware behavior analysis.

BACKGROUND OF THE DISCLOSURE

Malware, short for malicious software, is software used to disrupt computer operation, gather sensitive information, and/or gain access to private computer systems. It can appear in the form of code, scripts, active content, and other software. 'Malware' is a general term used to refer to a variety of forms of hostile or intrusive software. Malware includes, for example, computer viruses, ransomware, worms, Trojan horses, rootkits, key loggers, dialers, spyware, adware, malicious Browser Helper Objects (BHOs), rogue security software, and other malicious programs; the majority of active malware threats are usually worms or Trojans rather than viruses. As is widely known, there is a need for security measures to protect against malware and the like. Specifically, there is a need for zero day/zero hour protection against a rapidly morphing threat landscape. Security processing is moving to the Cloud including malware detection. For example, cloud-based malware protection is described in commonly-assigned U.S. patent application Ser. No. 12/185,484, filed Aug. 4, 2008, and entitled "CLOUD-BASED MALWARE DETECTION," the contents of which are incorporated by reference herein. With cloud-based malware protection, there needs to be a way to quickly detect malware and pass this detection on to provide zero day/zero hour protection.

BRIEF SUMMARY OF THE DISCLOSURE

In an exemplary embodiment, a cloud-based method includes receiving known malware signatures at one or more nodes in a cloud-based system; monitoring one or more users inline through the one or more nodes in the cloud-based system for regular traffic processing comprising malware detection and preclusion; determining unknown content from a user of the one or more users is suspicious of being malware; sending the unknown content to a behavioral analysis system for an offline analysis; and receiving updated known malware signatures based on the offline analysis.

In another exemplary embodiment, a behavioral analysis system for detecting malware from a cloud-based system includes a network interface; a data store; a processor communicatively coupled to the network interface and the data store; memory storing instructions that, when executed, cause the processor to: receive new content from the cloud-based system via the network interface for an offline analysis thereof; store the new content and track activity on the new content in the data store; perform the offline analysis comprising a static analysis and a dynamic analysis; determine whether the new content is malware based on the offline analysis; and update the cloud-based system regarding the offline analysis and whether the new content is malware.

In yet another exemplary embodiment, a cloud-based security system includes a plurality of nodes communicatively coupled to one or more users, wherein the plurality of nodes each perform inline monitoring for one of the one or more users for security comprising malware detection and preclusion; and a behavioral analysis system communicatively coupled to the plurality of nodes, wherein the behavioral analysis system performs offline analysis for any suspicious content from the one or more users which is flagged by the plurality of nodes; wherein the plurality of nodes each comprise a set of known malware signatures for the inline monitoring that is periodically updated by the behavioral analysis system based on the offline analysis for the suspicious content.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

Figure 13:
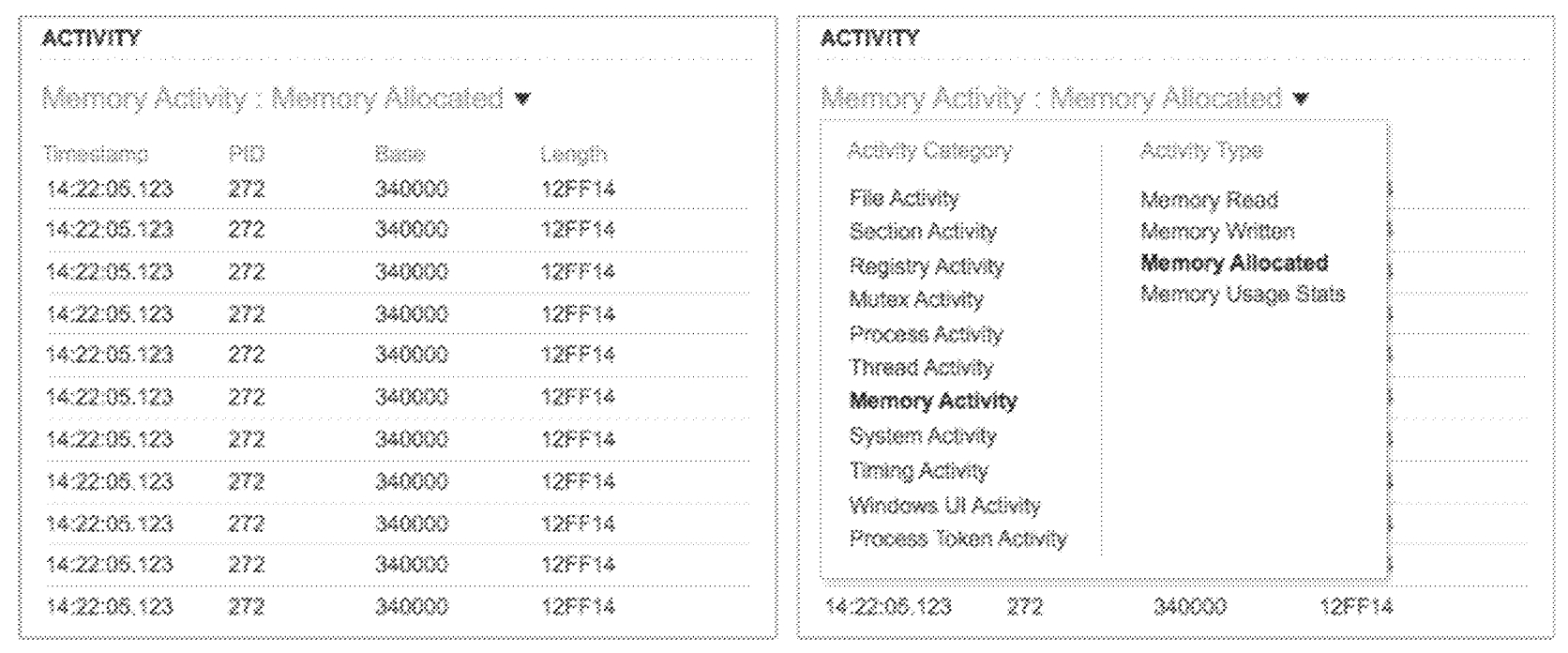

FIGS. 13-14 are screenshots of expanded views of Activity from the exemplary BA report of FIGS. 11-12;

FIG. 17 is screenshots of expanded views of classification information from the exemplary BA report of FIGS. 11-12;

FIG. 18 is screenshots of expanded views of file information from the exemplary BA report of FIGS. 11-12;

FIG. 19 is screenshots of expanded views of files dropped information from the exemplary BA report of FIGS. 11-12;

FIG. 20 is screenshots of expanded views of origin information from the exemplary BA report of FIGS. 11-12;

FIGS. 21-22 are screenshots of expanded views of network packets information from the exemplary BA report of FIGS. 11-12;

FIG. 27 is screenshots of expanded views of code manipulation information from the exemplary BA report of FIGS. 11-12; and FIG. 28 is a screenshot of expanded views of network destination information from the exemplary BA report of FIGS. 11-12.

DETAILED DESCRIPTION OF THE DISCLOSURE

In various exemplary embodiments, systems and methods for dynamic cloud-based malware behavior analysis (BA) are described which dynamically detect malware providing zero day/zero hour protection. In an exemplary embodiment, the systems and methods leverage a distributed, cloud-based security system to sandbox unknown content (which can also be referred to as BA content) in the cloud, to install the unknown content for observation and analysis, and to leverage the results in the cloud for near immediate protection from newly detected malware.

Figure 1:
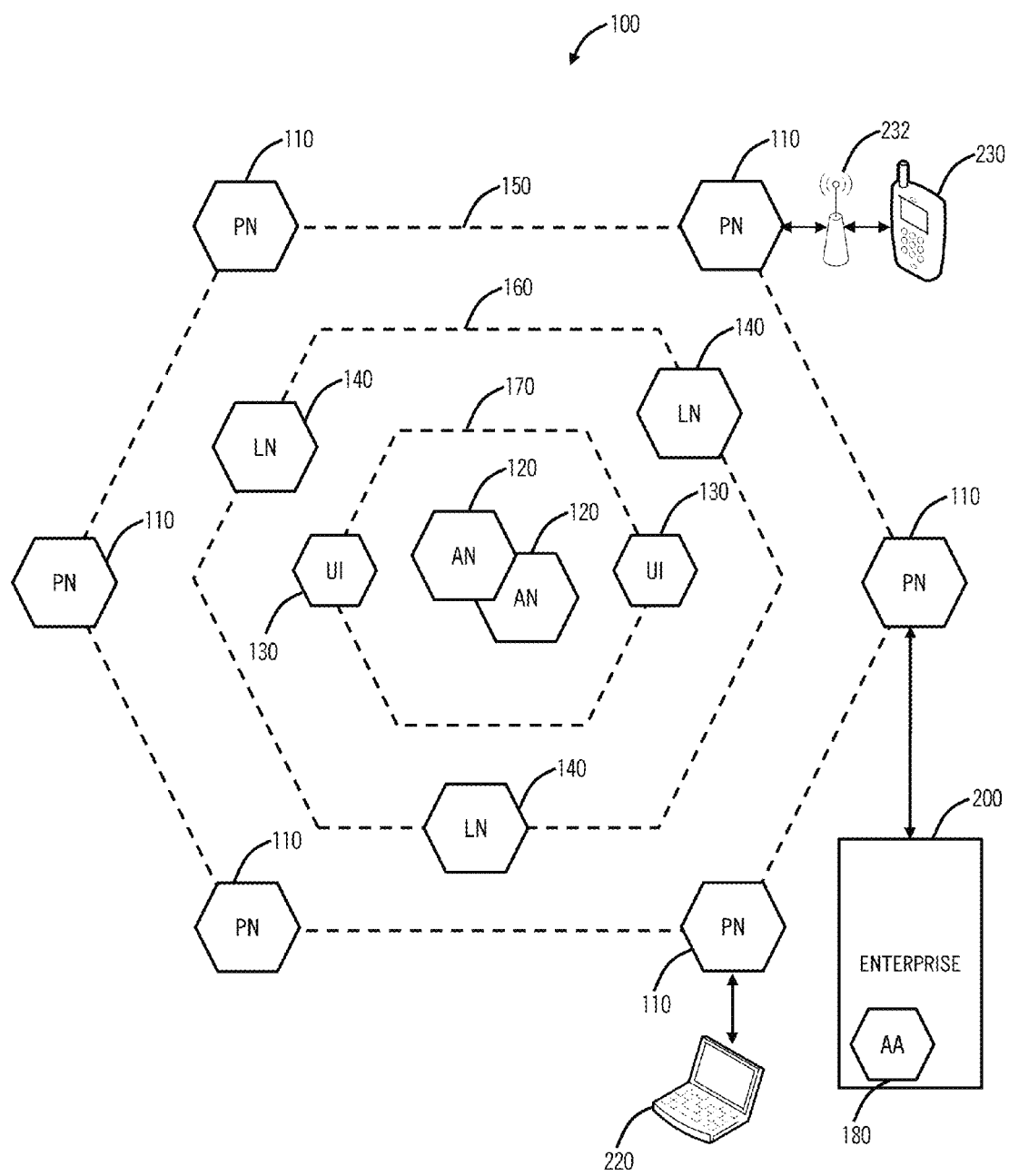

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes (PN) 110 (which can also be referred to as enforcement nodes (EN)), that proactively detect and preclude the distribution of security threats, e.g., malware, spyware, viruses, email spam, etc., and other undesirable content sent from or requested by an external system. The processing nodes 110 can also log activity and enforce policies. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
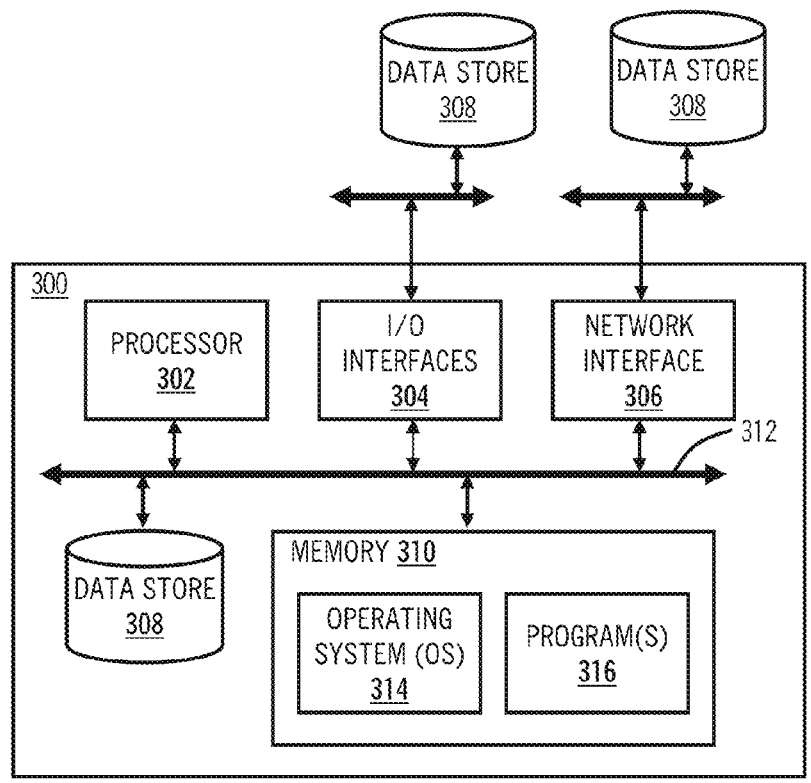
FIG. 3 is a block diagram of a server which may be used in the distributed security system of FIG. 1 or standalone.

Each of the processing nodes 110 may be implemented by one or more of computer and communication devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110. In an exemplary embodiment, the application layer 160 can continually update the processing nodes 110 with newly detected malware as described herein for zero day/zero hour protection.

Other application layer functions may also be provided in a data logging layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system. In view of the foregoing, the systems and methods described herein and, for example, the distributed security system 100 can be viewed as "security as a service" allowing threat detection, malware preclusion, etc. without having native applications installed on each individual user device or user equipment.

Figure 2:
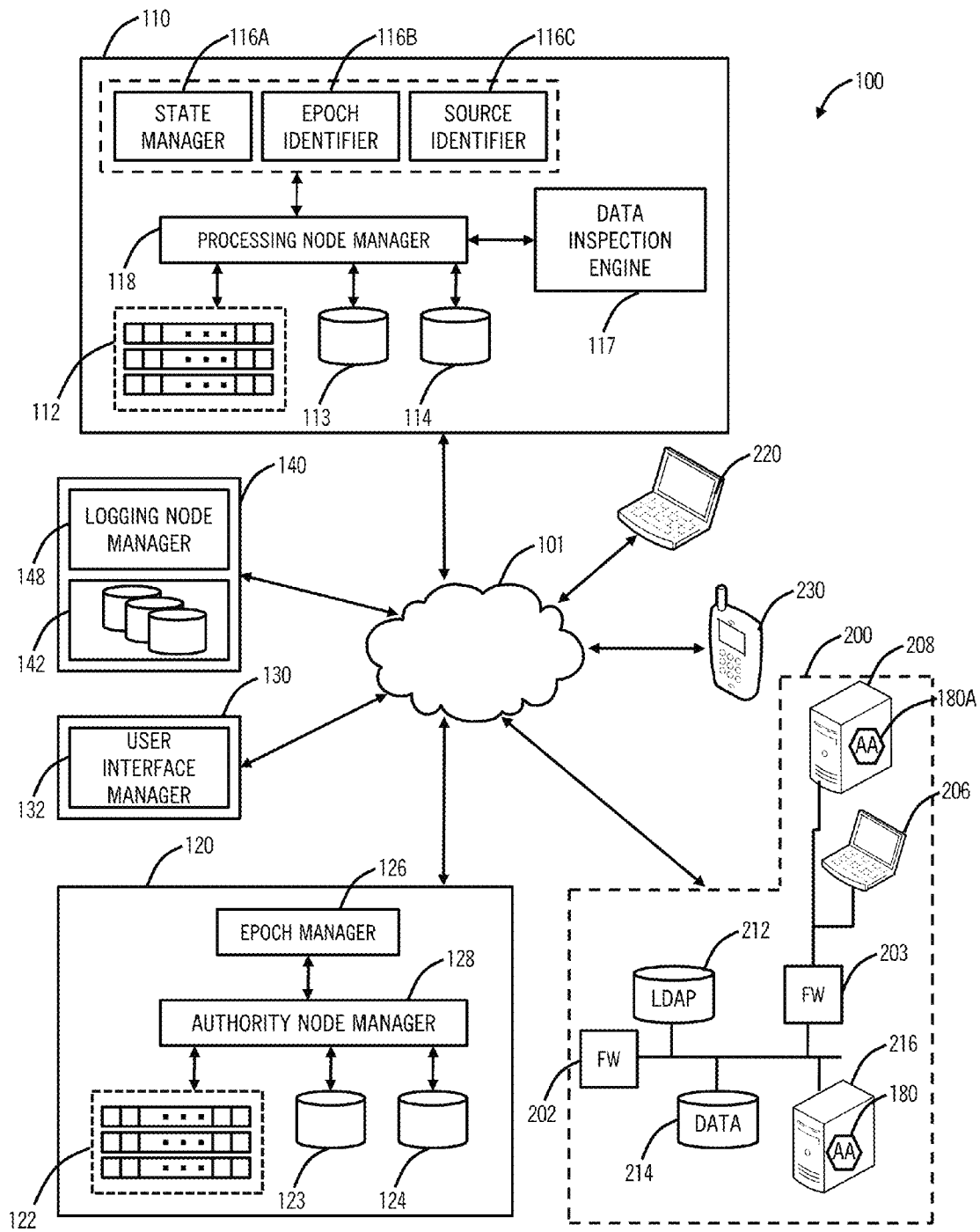
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node 120 data store. If responsive threat data is stored in the master threat data 124, then the authority node manager 128 provides a reply that includes the responsive threat data to the processing node 110 so that the processing node manager 118 can manage the content item in accordance with the security policy data 113 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and access agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
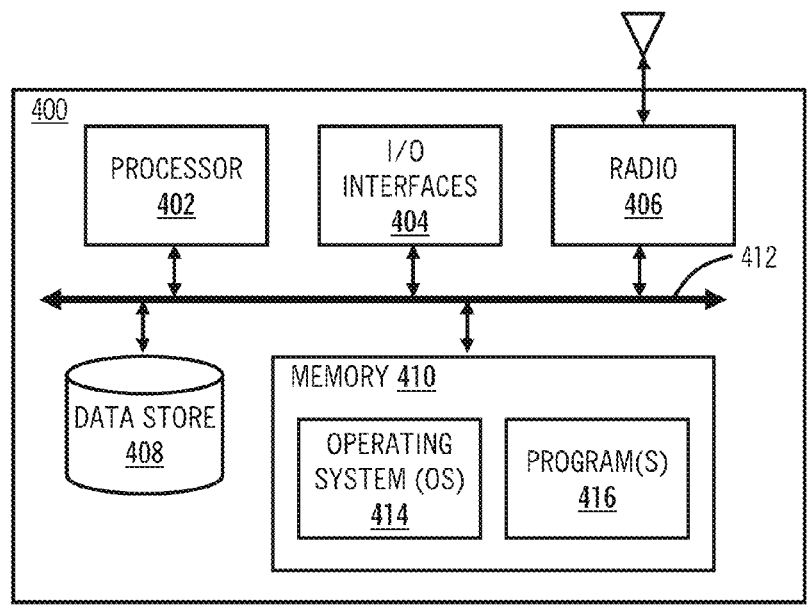
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

Figure 5:
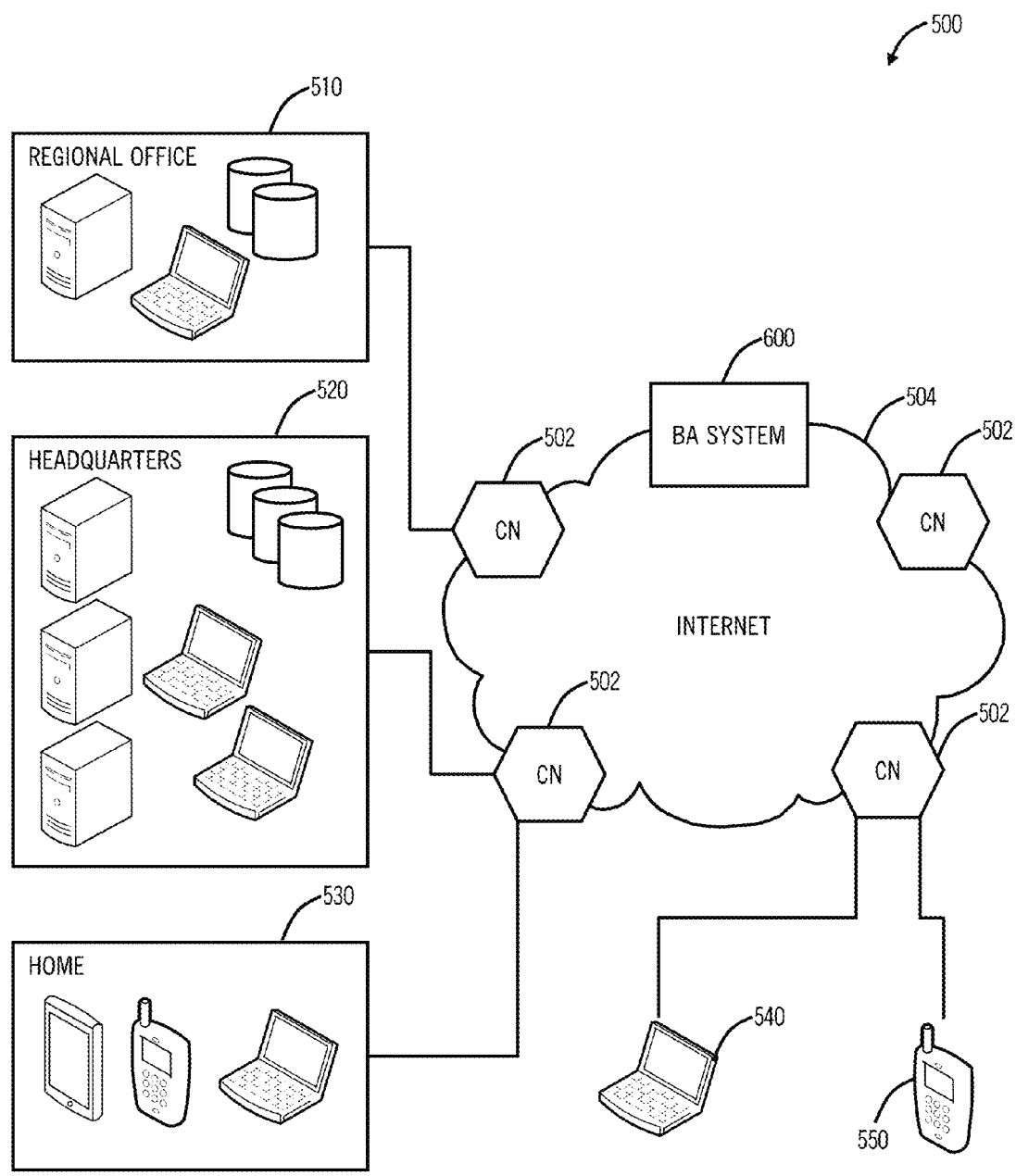
FIG. 5 is a network diagram of a cloud system.

Referring to FIG. 5, in an exemplary embodiment, a cloud system 500 is illustrated for the systems and methods for dynamic cloud-based malware behavior analysis. The cloud system 500 includes one or more cloud nodes (CN) 502 communicatively coupled to the Internet 504. The cloud nodes 502 may include the processing nodes 110, the server 300, enforcement nodes, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 550 is redirected to the cloud system 500 through the cloud nodes 502. That is, each of the locations 510, 520, 530, 540, 550 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, malware detection and blocking, and the like. In an exemplary embodiment, the cloud system 500 and the distributed security system 100 may be viewed as Security-as-a-Service through the cloud.

In an exemplary embodiment, the cloud system 500 can be configured to provide mobile device security and policy systems and methods as well as fixed device security. The mobile device 550 may be the mobile device 400, and may include common devices such as smartphones, tablets, netbooks, personal digital assistants, MP3 players, cell phones, e-book readers, and the like. The cloud system 500 is configured to provide security and policy enforcement for devices including the mobile devices 550 in the cloud. Advantageously, the cloud system 500 avoids platform specific security apps on the mobile devices 550, forwards web traffic through the cloud system 500, enables network administrators to define policies in the cloud, and enforces/cleans traffic in the cloud prior to delivery to the mobile devices 550. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc.

It is expected that the cloud nodes 502, the processing nodes 110, and/or some other cloud-based device is continually monitoring user activity for security including detection and preclusion of malware on the user's device. Also, the cloud system 500 is monitoring a large number of users concurrently. In various exemplary embodiments, a behavioral analysis (BA) system 600 can be included in and/or with the cloud system 500 (and/or the distributed security system 100). The BA system 600, in conjunction with the cloud system 500, the distributed security system 100, etc., is configured to act as a separate suspicious bucket for certain types of possible attacks for which there is not enough information to classify as either malicious or benign. The BA system 600 provides mechanisms to offload the more intensive operations from an inline analysis (in the cloud) to an offline analysis thereby providing a much needed breathing space vis-à-vis CPU and memory utilization on the processing nodes 110, the cloud nodes 502, etc. Additionally, the BA system 600 can leverage the number of users to quickly detect and preclude new malware.

Figure 6:
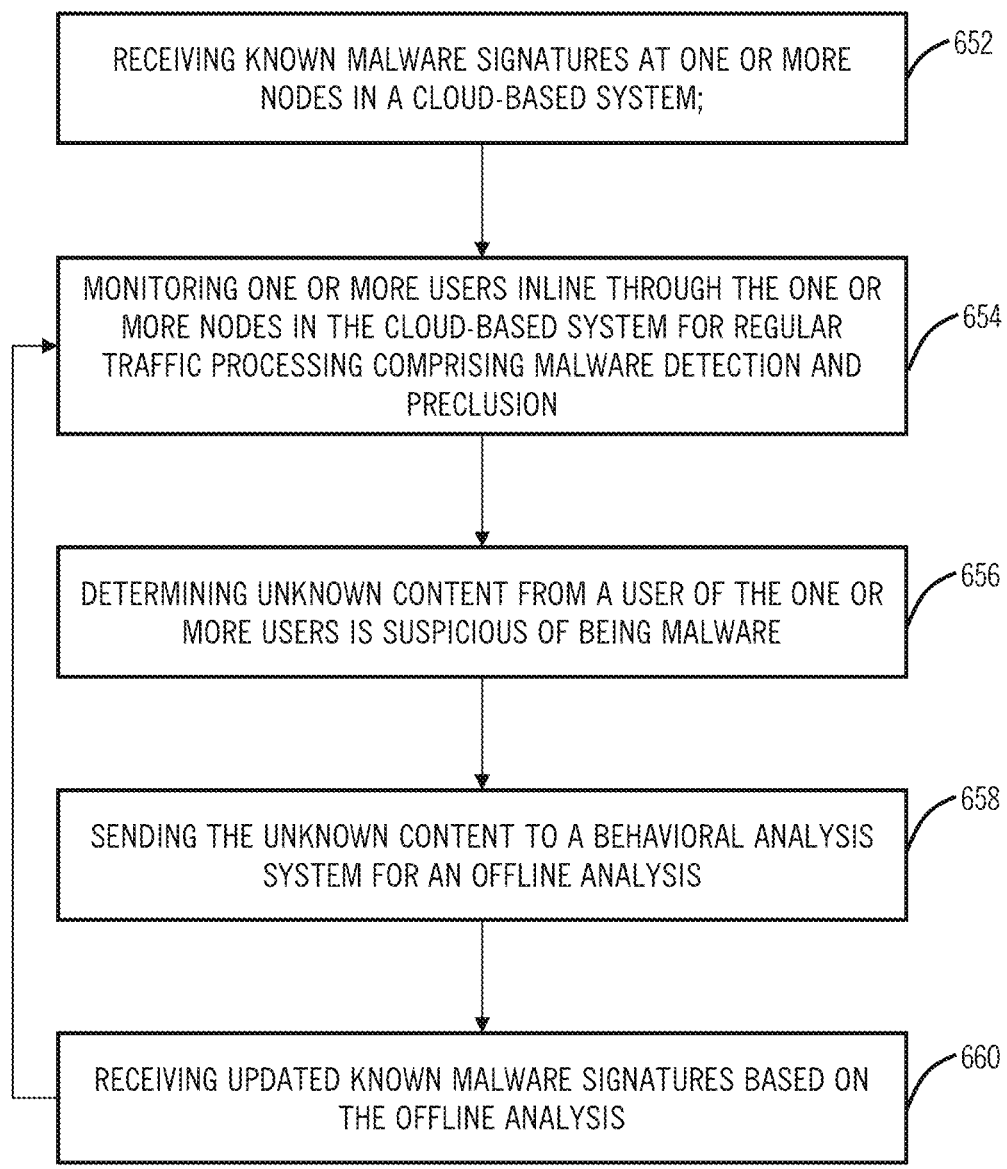
FIG. 6 is a flowchart

Referring to FIG. 6, in an exemplary embodiment, a flowchart illustrates a cloud-based method 650 in the cloud. The behavioral analysis method 650 can be implemented through the BA system 600 with any cloud-based system. The cloud-based method 650 includes receiving known malware signatures at one or more nodes in a cloud-based system (step 652). The cloud-based method 650 includes monitoring one or more users inline through the one or more nodes in the cloud-based system for regular traffic processing comprising malware detection and preclusion (step 654). Note, the cloud-based system can also monitor for other security aspects (e.g., viruses, spyware, data leakage, policy enforcement, etc.). The cloud-based method 650 includes determining unknown content from a user of the one or more users is suspicious of being malware (step 656). The cloud-based method 650 includes sending the unknown content to a behavioral analysis system for an offline analysis (step 658). Finally, the cloud-based method 650 includes receiving updated known malware signatures based on the offline analysis (step 660).

The cloud-based method 650 can include performing one of blocking or allowing the unknown content to or from the user based on policy. The one or more users can include a plurality of users associated with a plurality of companies, and the cloud-based method 650 can further include receiving a policy setting for each of the plurality of companies, wherein the policy setting comprises whether or not to perform the offline analysis for the unknown content; and performing the regular traffic processing for the unknown content for users associated with companies with the policy setting of not performing the offline analysis, wherein the regular traffic processing comprises monitoring for malware based on the offline analysis of other users. The cloud-based method 650 can include determining unknown content is suspicious based on analysis in the one or more nodes based on smart filtering determining that the unknown content is an unknown, active software file that performs some functionality on the user's device. The cloud-based method 650 can include storing the unknown content in the behavioral analysis system and maintaining an event log associated with the unknown content in the behavioral analysis system; and performing the offline analysis on the unknown content comprising a static analysis and a dynamic analysis. The unknown content can be stored in an encrypted format, and the cloud-based method 650 can include storing results data from various stages of the offline analysis of the unknown content, wherein the results data comprises static analysis results, JavaScript Object Notation (JSON) data from the dynamic analysis, packet capture data, screenshot images, and files created/deleted/downloaded during the dynamic analysis.

The static analysis can evaluate various properties of the unknown content and the dynamic analysis runs the unknown content on a virtual machine operating an appropriate operating system for the unknown content. The cloud-based method 650 can include performing the offline analysis as a combination of a static analysis and a dynamic analysis by the behavioral analysis system. The static analysis can evaluate various properties of the unknown content using a set of tools based on a type of file of the unknown content, wherein the set of tools comprise any of checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis. The dynamic analysis can run the unknown content on a virtual machine operating an appropriate operating system for the unknown content and evaluates any of JavaScript Object Notation (JSON) data generated; temporary files generated, system and registry files modified; files added or deleted; processor, network, memory and file system usages; external communications; security bypass; data leakage; and persistence.

Figure 7:
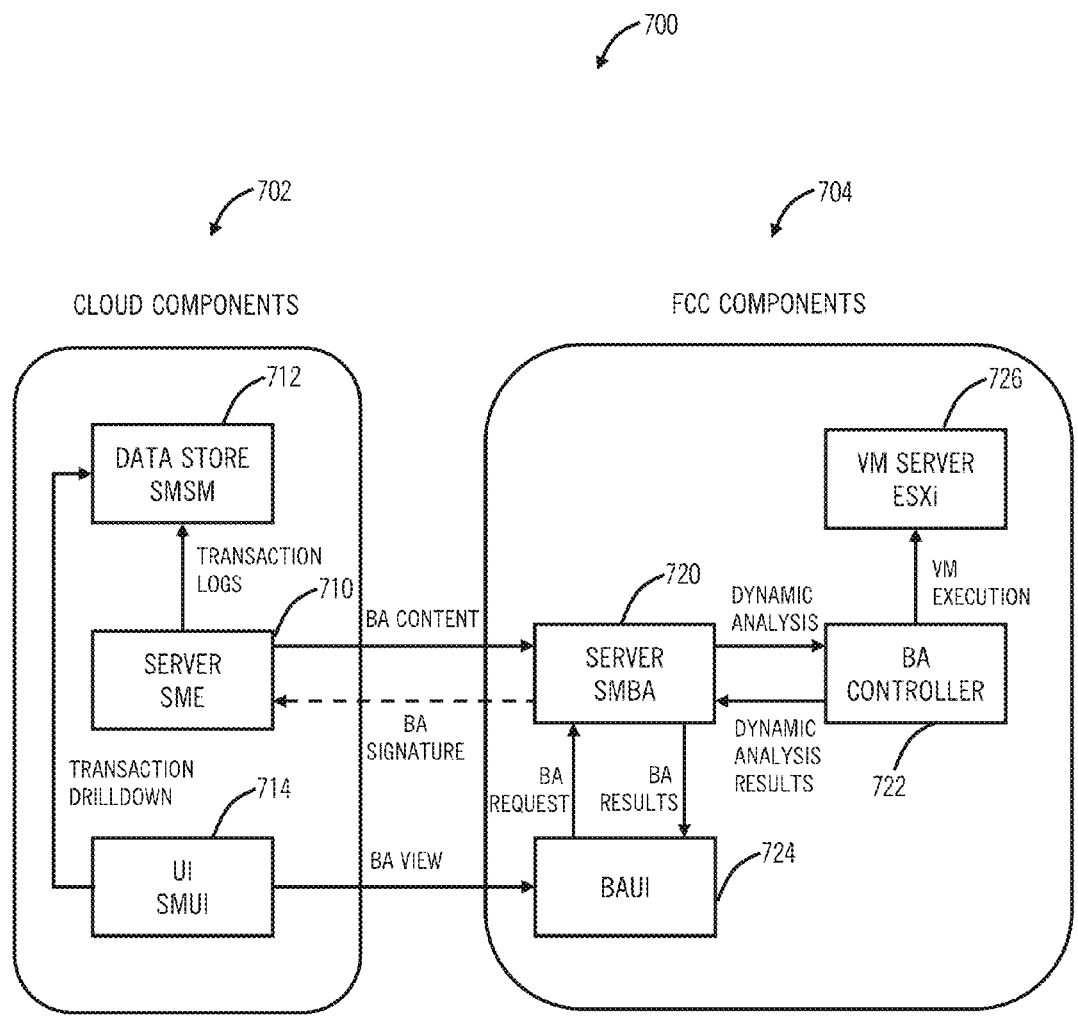
FIG. 7 is a block diagram of an exemplary implementation of a BA system for use with the distributed security system, the cloud system, or any other cloud-based system.

Referring to FIG. 7, in an exemplary embodiment, a block diagram illustrates an exemplary implementation of a BA system 700 for use with the distributed security system 100, the cloud system 500, or any other cloud-based system. FIG. 7 is presented as an exemplary implementation of the BA system 700 and those of ordinary skill in the art will appreciate other implementations providing similar functionality are also contemplated. The BA system 700 can be an exemplary implementation of the BA system 600 for carrying out the behavioral analysis method 650. The BA system 700 can include cloud components 702 and Feed Central Cloud (FCC) components 704. The cloud components 702 can include the processing nodes 110, the cloud nodes 502, etc. The cloud components 702 are generally used to monitor users in the cloud, to detect known malware, to provide unknown files that could be malware to the FCC components 704, and to receive updates to known malware from the FCC components 704. The FCC components 704 are generally configured to receive unknown files and determine whether they are malicious (malware) or benign and provide this information to the cloud components 702. The FCC components 704 can perform a static analysis and a dynamic analysis of the unknown files in an offline manner whereas the cloud components 702 are configured to detect malware inline. As described herein, the FCC components 704 can also be referred to as BA infrastructure.

Figure 8:
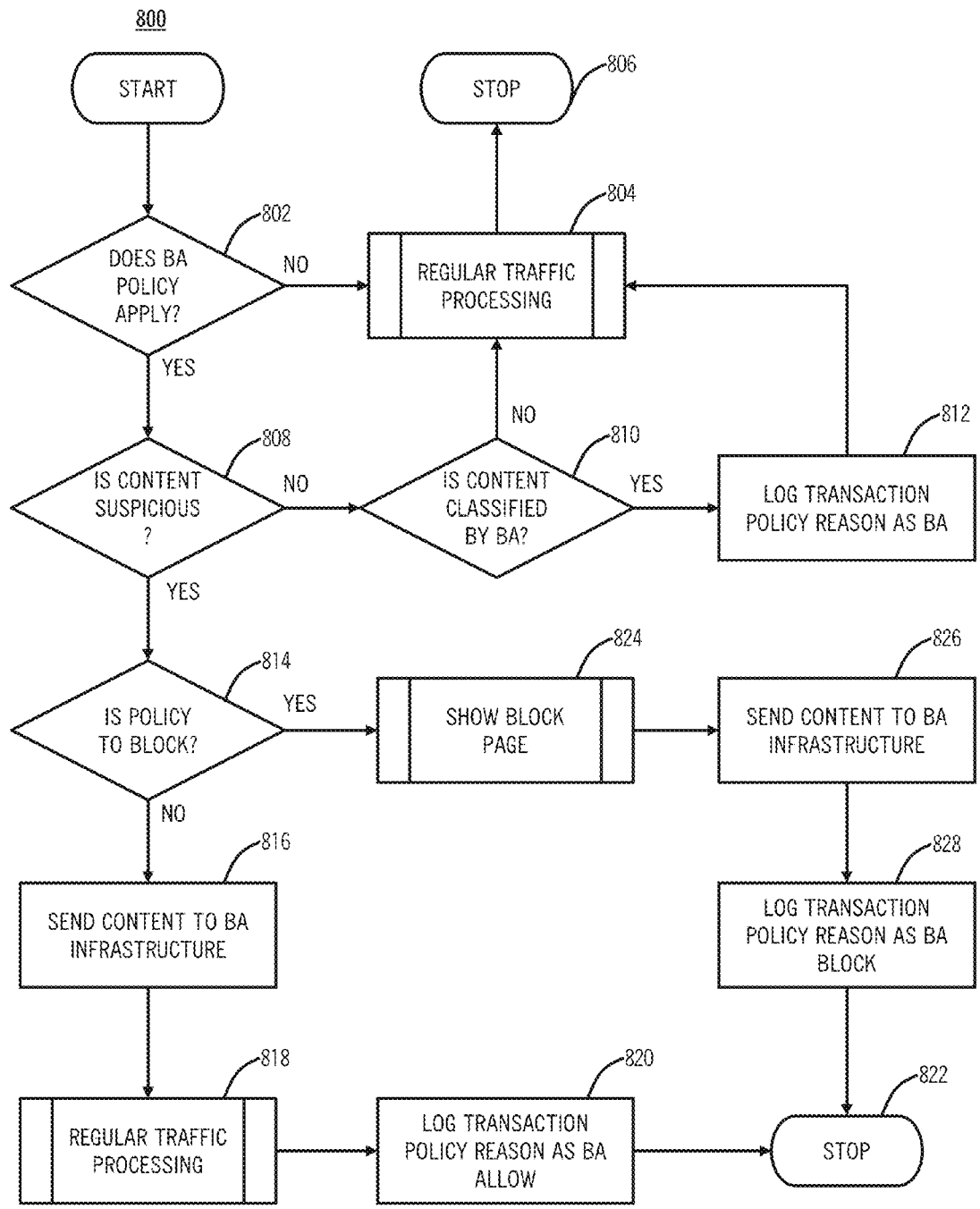
FIG. 8 is a flowchart of an operational method performed by a server in cloud components of the BA system of FIG. 7.
Figure 9:
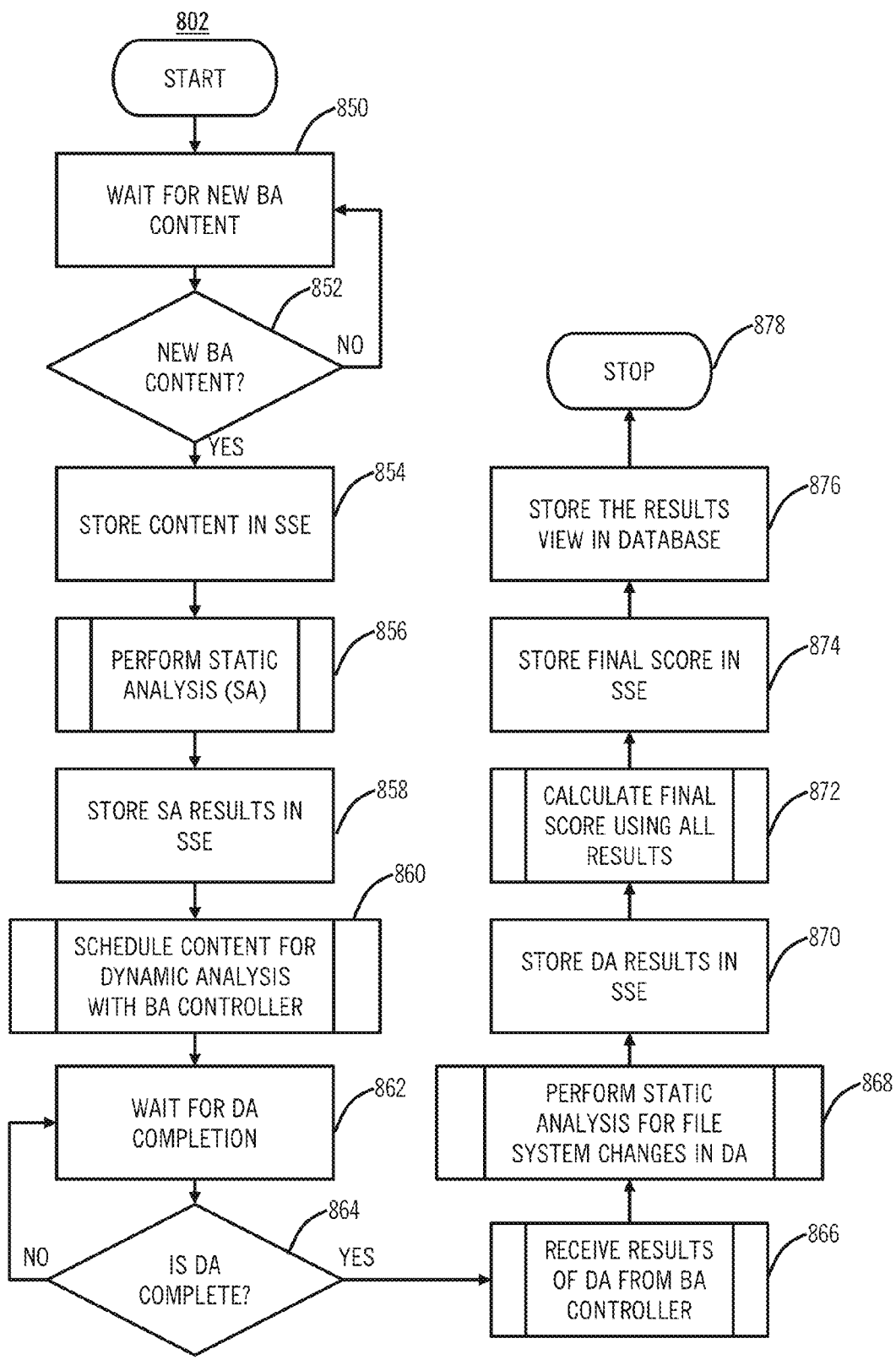
FIG. 9 is a flowchart of an operational method performed by a server in BA infrastructure of the BA system of FIG. 7.
Figure 10:
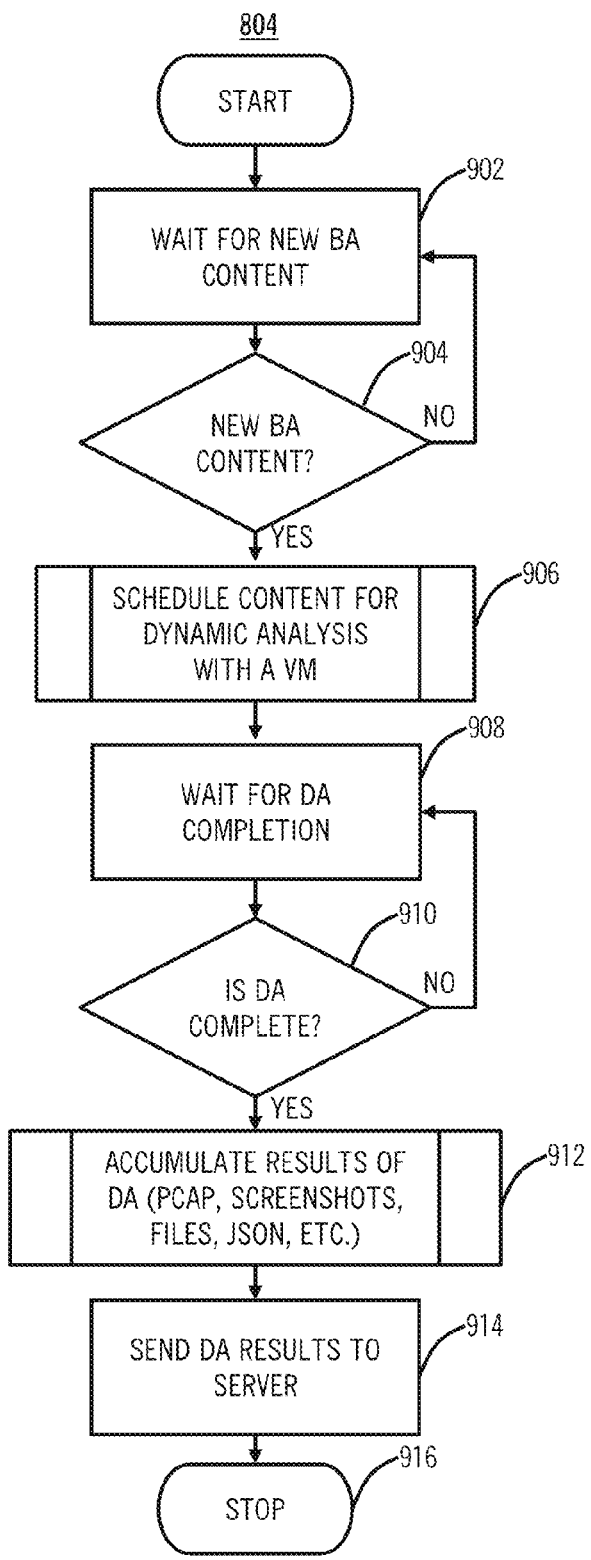
FIG. 10 is a flowchart of an operational method performed by a BA controller in BA infrastructure of the BA system of FIG. 7.

The cloud components 702 can include a server 710 (or plurality of servers 710), a data store 712, and a user interface (UI) 714. The server 710 can include the processing nodes 110, the cloud nodes 502, etc. and the server 710 is generally the initiator and final consumer of results from the BA system 700, i.e. the server 710 inter alia detects and precludes malware as well as flagging unknown files for BA analysis by the BA system 700. The data store 712 can be a storage mechanism for all transaction logs and reporting mechanism. The UI 714 can provide the ability to configure BA policies as well as turning it on/off at a company level. It is also the gateway to all reports and forensic analysis. The FCC components 704 can include a server 720, a BA controller 722, a BAUI 724, and a Virtual Machine (VM) server 726. The server 720 provides a gateway to the BA infrastructure in the FCC components 704 and acts a consolidated secure (encrypted) storage server for BA content. The BA controller 722 provides sandboxing functionality for performing dynamic analysis of BA content. The BAUI 724 provides a user interface to view the analysis results of BA content. Finally, the VM server 726 provides a VM infrastructure used by the BA controller 722 for dynamic analysis of BA content. Note, the cloud components 702 and the FCC components 704 as described herein can be a combination of hardware, software, and/or firmware for performing the various functionality described herein. FIGS. 8-10 are flowcharts of exemplary operational methods 800, 802, 804 performed by the server 710 (FIG. 8), the server 720 (FIG. 9), and the BA controller 722 (FIG. 10).

Variously, the FCC components 704 are configured to distribute known malware signatures to the cloud components 702, e.g. the distributed cloud enforcement nodes. The cloud components 702 monitor inline users such as using HTTP and non-HTTP protocols (to cover proxy and firewall/DPI) to detect and block/preclude malware. In addition, the cloud components 702 perform intelligent collection of unknown malware from distributed cloud enforcement nodes. The enforcement nodes decide what is unknown malware—smart filtering based on signatures and static/dynamic analysis criteria, that can be performed quickly inline, and send it securely and efficiently to BA Analysis engine in the cloud, i.e. the FCC components 704. The FCC components 704 is a BA Analysis Engine which includes secure content storage with data destruct capabilities, is a scalable and flexible platform for VM based execution sandboxes, includes a smart scheduler to determine what needs to be analyzed and manage BA content from the cloud, and includes threat reporting storage and UI infrastructure for malware result analysis and research. The FCC components 704 can provide dynamic updates based on latest malware analysis thereby providing zero day/zero hour protection.

FIG. 8 illustrates the exemplary operational method 800 performed by the cloud components 702, such as the server 710. The server 710 is the initiator for the BA logic sequence. Generally, the server 710 is configured to process policy information related to BA, and this can be managed with flags to enable/disable the feature at the company level. The server 710 is further configured to consume signatures (related to BA) that are created by the BA infrastructure, i.e. the FCC components 704 and the like. The signatures can be in the form of MD5 hashes or the like. The server 710 is configured to enforce policy based on configuration, to log transactions to the data store 712 with information included therein such as policy reason and Threat category/super category information, and to send BA content to the BA infrastructure (specifically the server 720). In an exemplary embodiment, the server 710 can be the processing node 110, the cloud node 502, etc. That is, the server 710 is generally performing inline traffic processing between a user and another domain in an external fashion as a cloud-based system (security-as-a-service).

The server 710 can perform various aspects of inline traffic processing such as virus detection and prevention, malware detection and prevention, data leakage prevention, policy enforcement, etc. The focus here is on the malware detection and prevention, but it is expected that the server 710 also provides other security functions. As described herein, malware includes code, scripts, active content, and other software that is used to disrupt computer operation, gather sensitive information, and/or gain access to private computer systems. That is, malware is active software installed on a user's device for malicious purposes and can include executable files (e.g., .EXE), Dynamic Link Libraries (DLL), documents (e.g., .DOCX, .PDF, etc.), etc. The server 710, in conjunction with the server 720, can include a set of known malware that is detected and precluded. However, as malware is constantly evolving, there is a need to detect quickly (zero day/zero hour protection) new malware files. This is the objective of the BA infrastructure—to sandbox potential files for malware BA and to update the set of known malware based thereon.

The operational method 800 starts and determines if a BA policy applies (step 802). The BA policy determines whether or not processing for a particular user, company, set of users, etc. utilizes the BA infrastructure. Note, the BA policy does not mean whether or not the server 710 scans for known malware; rather the BA policy determines whether the server 710 performs BA on unknown files that could possibly be malware to detect new malware and add to the list of known malware. If there is no BA policy (step 802), the operational method 800 performs regular traffic processing (step 804). The regular traffic processing can include the various techniques and processes described herein for security in the cloud, and the operational method 800 stops (step 806). If there is a BA policy (step 802), the operational method 800 checks if content is suspicious (step 808). Content may be suspicious, from a malware perspective, if it is unknown, active software that performs some functionality on the user's device. Determining the content is suspicious can be based on smart filtering that performs a quick analysis inline in the cloud. If the content is not suspicious (step 808), the operational method 800 checks if the content is already classified by the BA or another system (step 810), and if so, the operational method 800 makes a log transaction for the content with a policy reason as BA (step 812). If the content is not already classified (step 810), the operational method 800 performs the regular traffic processing (step 804).

If the content is suspicious (step 808), the operational method 800 checks whether the policy is to block or not (step 814). Note, suspicious content may or may not be malware; it is the purpose of the BA infrastructure (e.g., the FCC components 704) to determine this. However, the operational method 800 can allow or block the suspicious content (while also sending the suspicious content to the BA infrastructure. If the policy is not to block (step 814), the operational method 800 sends the content to the BA infrastructure (e.g., the FCC components 704 for performing the functionality in FIGS. 9 and 10) (step 816). Next, the operational method 800 performs regular traffic processing (step 818) (same as step 804), the operational method 800 logs the transaction as a policy reason BA allow (step 820), and the operational method 800 ends (step 822). If the policy is to block (step 814), the operational method 800 blocks the content and shows the user a block page (step 824). The block page notifies the user that the content was suspicious and blocked. The operational method 800 sends the content to the BA infrastructure (e.g., the FCC components 704 for performing the functionality in FIGS. 9 and 10) (step 826), the operational method 800 logs the transaction as a policy reason BA block (step 820), and the operational method 800 ends (step 822).

The UI 714 provides the ability to configure policy at the company level, or at some set or subset of users, with features that are enabled/disabled using a few checkboxes, for example. The UI 714 provides a high level view of the BA system 700 for a company using specific BA reports and the UI 714 provides the ability to view analysis details of any threat from transaction drilldowns. The data store 712 is configured to store transaction logs from the server 710, to provide counter infrastructure for all BA reports, and to provide querying infrastructure for BA transactions. For example, the data store 712 can add a new BA record and handle it in live/sync data paths, perform query module handling for this new BA record, also some new filters will be added for BA like MD5, perform BA counter handling, and the like. For example, the counter infrastructure can use the following dimensions:

| Dimension | Values |
| --- | --- |
| MalwareReason | One of the following values [Submitted, Benign, Suspicious, Adware, Malware, Anonymizer] |
| Direction | One of the following values [Inbound, Outbound] |
| Action | [Allowed, Blocked] |

The UI 714 can provide various reports such as a combination of the following filters for drilldown:

| Chart Type | Drilldown Area |
| --- | --- |
| BA Actions | Blocked |
| BA Actions | Quarantined |
| BA Actions | Sent for Analysis |
| BA Categorization | Suspicious Behavior |
| BA Categorization | Botnet & Malware Behavior |
| BA Categorization | Adware Behavior |
| BA Categorization | Anonymizer Behavior |

FIG. 9 illustrates the exemplary operational method 802 performed by a gateway element in the BA infrastructure (e.g., the FCC components 704), such as the server 720. The server 720 is a critical component in the BA architecture that integrates all the other subsystems; it is the central authority for all things involved with BA. The server 720 (or gateway to the BA infrastructure) has the following functional components a Secure Storage Engine (SSE), a Static Analysis Engine (SAE), a Dynamic Analysis Scheduling Engine (DASE), a Database Engine, a Scoring Engine and a Reporting Engine. The SSE is responsible for the persistent storage of the BA Content to be analyzed. The results of the analysis is stored in the SSE as well. All data related to the customers are stored in encrypted format using symmetric keys (e.g., AES256). The encryption keys are pregenerated (well in advance) at regular intervals. The encryption keys are not stored in SSE. They are retrieved at runtime from the Certificate Management Server (currently Central Authority [SMCA] in the Feed Central Cloud), i.e. they are retrieved at runtime on the server 720 for use. The SSE can store an activity ledger for all that has happed for the content which various events recorded, such as what happened to the content?, what state is the content in?, and, in case of a crash, to continue processing the content from where it was left off. Exemplary events can include storing the content, completing a static analysis of the content, starting a dynamic analysis of the content, completing the dynamic analysis of the content, calculating a final score for the content, and modifying the score of the content. The SSE can also store results data at various stages of analysis of the content, such as Static Analysis Results, JavaScript Object Notation (JSON) data from the Dynamic Analysis, Packet Capture Data, Screenshot Images, and Files created/deleted/downloaded during the sandbox analysis.

The BA infrastructure generally uses two techniques to evaluate unknown content to detect malware—Static Analysis and Dynamic Analysis—and results of the two are scored to determine whether or not the unknown content is malware. Generally, the Static Analysis looks at various properties of the unknown content whereas the Dynamic Analysis actually runs the unknown content. The SAE analyzes the unknown content for known signatures (benign or malicious) using a set of tools based on the type of the file. Some exemplary tools include:

VirusTotal: Using a Web Application Programming Interface (API), the MD5 of the unknown content is sent to a third party service to check for known viruses as determined by various anti-virus (AV) engines;

Yara tool: Using a Perl Compatible Regular Expressions (PCRE) engine, the unknown Content is analyzed for known signatures. The signatures are sourced from various third party services as well as internally developed by the operators of the distributed security system 100;

Certificate Analysis: Using Portable Executable (PE)/Common Object File Format (COFF) specifications, identify the code signing certificates to form a whitelist of known benign content; and Zulu (available from zscaler.com): Using the URL Risk Analyzer, the original URL as well as the IPs and URLs resulting from the Dynamic Analysis are further analyzed.

Basically, the SAE looks for known attributes that could lead the unknown content to be malware—such as previously detected signatures, detecting known malware signatures, analyzing the source of the unknown content, etc.

The DASE schedules the Dynamic Analysis, which is performed by the BA controller 722 and the VM server 726. The Dynamic Analysis can be referred to as sandboxing where the unknown content is thrown into a "sandbox," i.e., the VM server 726, and run to see what happens. The DASE is configured to schedule the unknown content within the limitations of the Sandboxing Infrastructure (i.e., the BA controller 722 and the VM server 726). The DASE can act as queuing manager and scheduler. After static analysis, unknown content can be queued based on priority (known viruses get lower priority), availability, and content type. For example, if an unknown content is identified as a Windows executable/DLL it needs to be sent to the BA Controller 722 which uses a Windows XP guest Operating System (OS), if an unknown Content is identified an Android application package file (APK), it needs to be sent to the BA controller 722 which uses an Android OS, etc.

The Database Engine is used to maintain a view of data as stored in the SSE. Customer centric data which requires to be stored in an encrypted format may not be stored in the database. This is a temporary arrangement for quicker access of preformatted data for research purposes. The database tables can be designed in such a way so as to avoid row updates (as much as possible) during runtime. In case of any conflicts with the data in the SSE, the SSE can be the authority and the view in database can be recreated at any point from the data in the SSE. The Scoring Engine is for analyzing the results using a configurable scoring sheet to arrive at a final score for the unknown content once all of the Behavioral Analysis is complete. For example, the Scoring Sheet is a file serialized in JSON format that provides individual scores for various components in the analysis. The Reporting Engine provides a querying interface for the BAUI 724 to display the required results of the Behavioral Analysis to the user. The results for the commands can be retrieved from one of the following sources: Information available in memory (cache) score, category, etc.; Information available in disk (SSE), packet captures, screenshots etc.; Information available in the database Protocol Information (HTTP/SMTP) etc.; and any combination thereof.

The server 720 interfaces to the sever 710 (receiving BA content from the server 710 and sending BA signatures to the server 710), the BAUI 724 (sending BA results to the BAUI 724 and receiving BA requests from the BAUI 724), and the BA controller 722 (queuing a Dynamic Analysis by the BA controller 722 and receiving Dynamic Analysis results from the BA controller 722). The operational method 802 starts, such as at startup of the server 720, and waits for new BA content (steps 850, 852). The operational method 802 stores new content in the SSE (step 854), and performs the Static Analysis (SA) (step 856). The operational method 802 stores the SA results in the SSE (step 858) and schedules the BA content for Dynamic Analysis (DA) with the BA controller 722 (step 860). The operational method 802 waits for completion of the DA (steps 862, 864). The operational method 802 receives results of the DA from the BA controller 722 (step 866).

Next, the operational method 802 can perform a static analysis for file system changes in the DA (step 868). Here, the operational method 802 is looking to see what changes the BA content made when executed or opened in the DA. The operational method 802 stores the DA results in the SSE (step 870). The operational method 802 calculates a final score for the BA content using all results—SA and DA (step 872). The final score can also be manually be modified if reviewed by operators of the BA system 700. The final score is stored in the SSE (step 874), the operational method 802 stores the results view in the database (step 876), and the operational method 802 ends (step 878).

FIG. 10 illustrates the exemplary operational method 804 performed by the BA controller 722 in the BA infrastructure (e.g., the FCC components 704). The BA Controller 722 is the engine that controls the sandboxing environment. The sandbox is used to execute the BA content in a controlled VM environment, such as on the VM server 726. It then evaluates the file system changes, network activity, etc., to analyze the threat posed by the BA content. The BA controller 722 performs the following functions: Receives BA Content from the server 720 and sends it for execution (Dynamic Analysis DA) with one of the available VM guests on the VM server 726; accumulates all the pertinent results (results in JSON format, packet capture, screenshots, file system changes, etc.) from the DA and send them to the server 720; cleans up temporary files generated; and tracks CPU, network, memory and file system usages on the controller for monitoring. Note, the VM server 726 can be implemented on the BA controller 722 or in another device.

The operational method 804 starts and waits for BA content (steps 902, 904). The operational method 804 schedules received BA content for the Dynamic Analysis with a VM (step 906). The operational method 804 waits for completion of the DA (steps 908, 910). The operational method 804 accumulates results of the DA (e.g., packet capture (PCAP), screenshots, files, JSON, etc.). The operational method 804 sends the DA results to the server 720 (step 912), and the operational method 804 ends (step 916).

The VM server 726 provides a VM infrastructure for use by the BA Controller 722 for Dynamic Analysis. The VM server 726 can utilize conventional sandboxing functionality, and can operate all Windows based-systems (Windows XP, Windows 7 32/64 bit, Windows 8/8.1 32/64 bit) as well as Android, iOS, MacOS, Linux, etc. The BAUI 724 is a web application deployed on a server in the FCC components 704. It can also be deployed on separate hardware. It primarily provides the following two functionality: provides a user interface for the detailed analysis of a BA Content, and provides a user interface for the Security Research team to manage the various threats.

Figure 11:
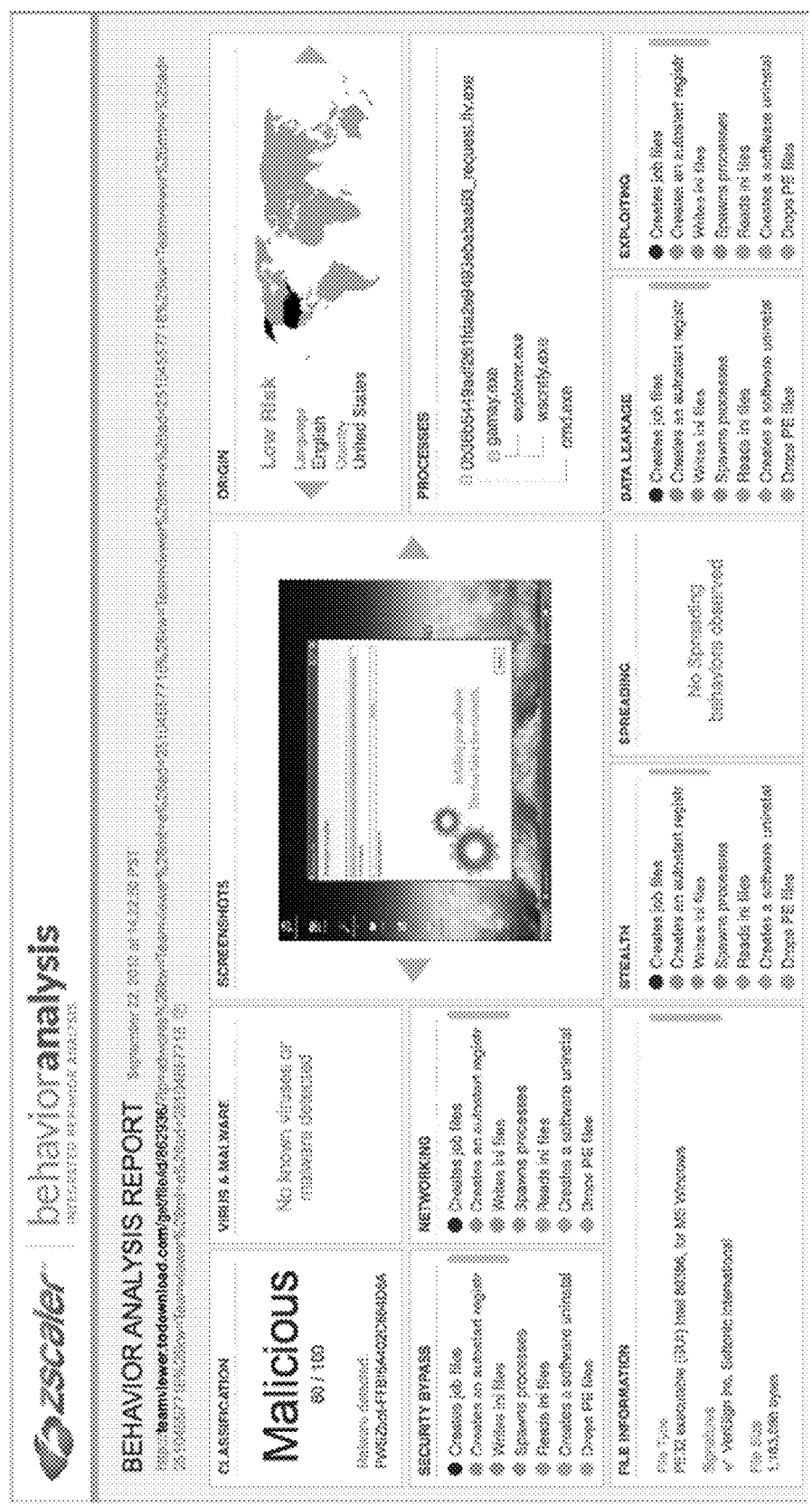
FIGS. 11-12 are a screenshot of an exemplary BA report.
Figure 12:
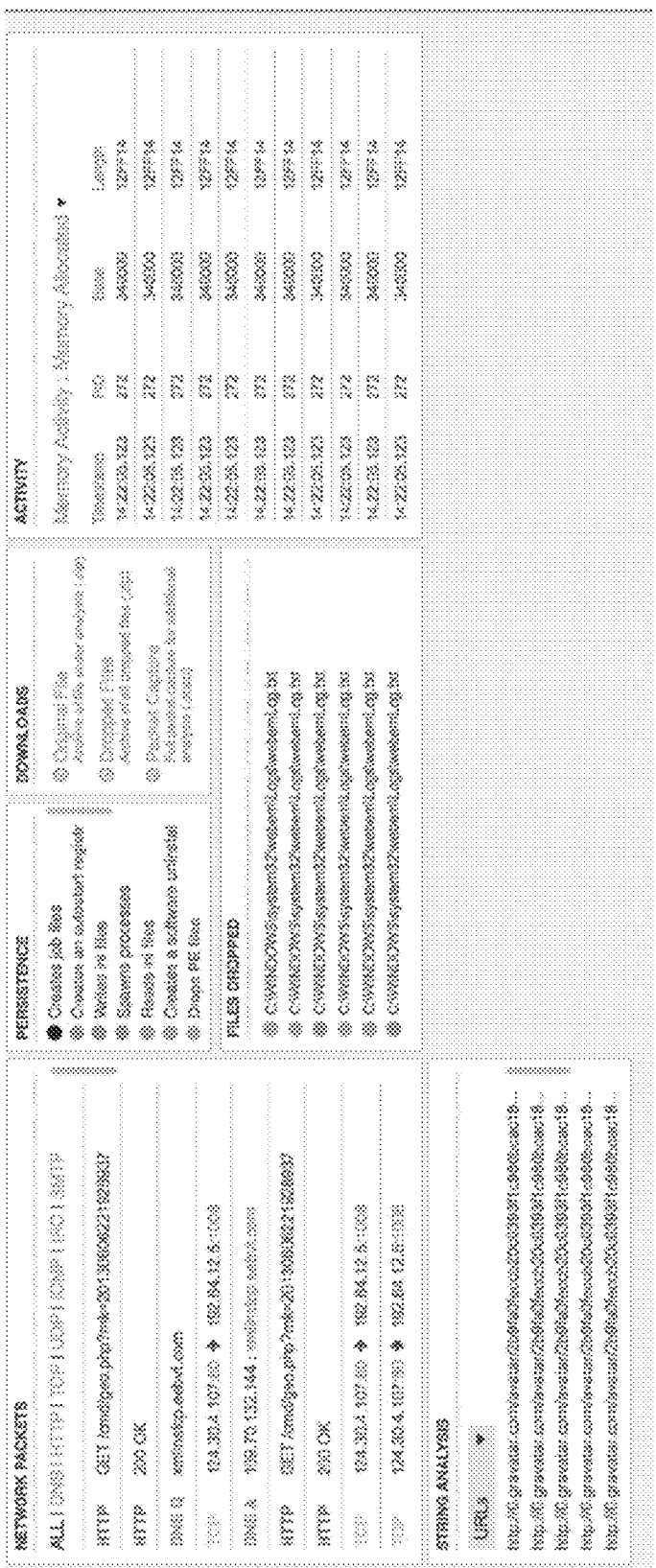

Referring to FIGS. 11-28, in various exemplary embodiments, screenshots are illustrated for an exemplary BA report from the BA system 700. These screenshots are presented to illustrate an exemplary operation of the BA system 700 and some of the behavioral detailed determined thereby. FIGS. 11-12 are a screenshot of the exemplary BA report (split into two Figures for size). The remaining FIGS. 13-28 are expanded views of the screenshot from FIGS. 11-12. FIGS. 13-14 are screenshots of expanded views of Activity from the exemplary BA report. The Activity block shows a table with one row representing each event of a particular activity type. The columns and data format are unique to each activity type. Some columns may not be displayed in the compact view in order to fit the block width. Activity types are grouped into categories. A dropdown allows the user to select the category and activity type to display. This illustrates various activity from the DA including, for example, file activity, section activity, registry activity, mutex activity, process activity, thread activity, memory activity, system activity, timing activity, Windows UI activity, and process token activity.

Figure 15:
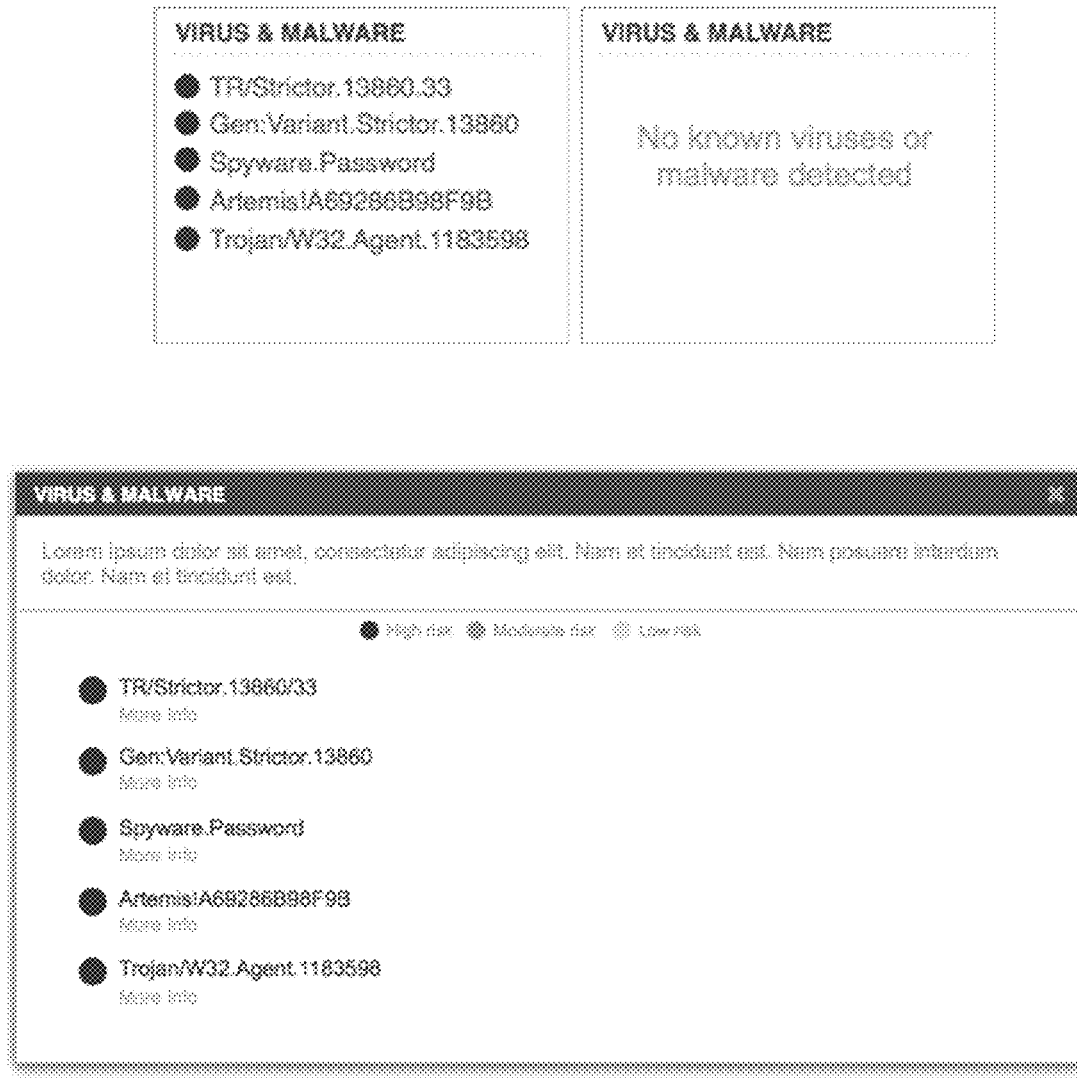
FIG. 15 is screenshots of expanded views of virus and malware information from the exemplary BA report of FIGS. 11-12.
Figure 16:
FIG. 16 is screenshots of expanded views of category and behavior information from the exemplary BA report of FIGS. 11-12.

FIG. 15 is screenshots of expanded views of virus and malware information from the exemplary BA report. The Virus and Malware block shows a severity indicator icon and threat name for each virus/malware detected in the file. If no threats are found a message to that effect is displayed. The expanded view adds descriptive text for the block as a whole as well as a link to a threat library for each detected threat. FIG. 16 is screenshots of expanded views of category and behavior information from the exemplary BA report. The Category blocks show a severity indicator icon and label for each detected behavior in the category. If no behaviors are found a message to that effect is displayed. There can be seven separate category blocks, one for each category of behavior: 1. Security Bypass; 2. Networking; 3. Stealth; 4. Spreading; 5. Data Leakage; 6. Exploiting; and 7. Persistent. The expanded view adds descriptive text for the overall category as well as for each behavior. Some behaviors will have additional related information which is displayed in a text area.

Figure 17:
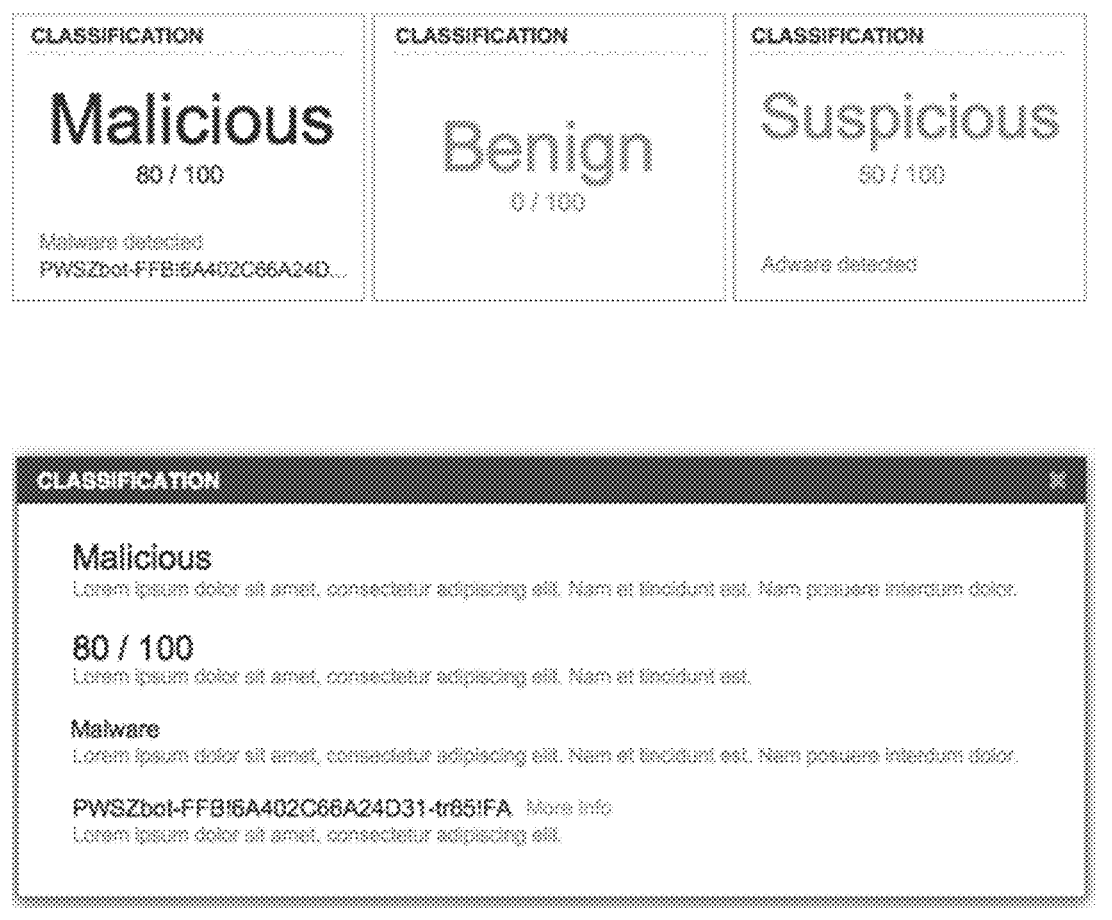
Figure 18:
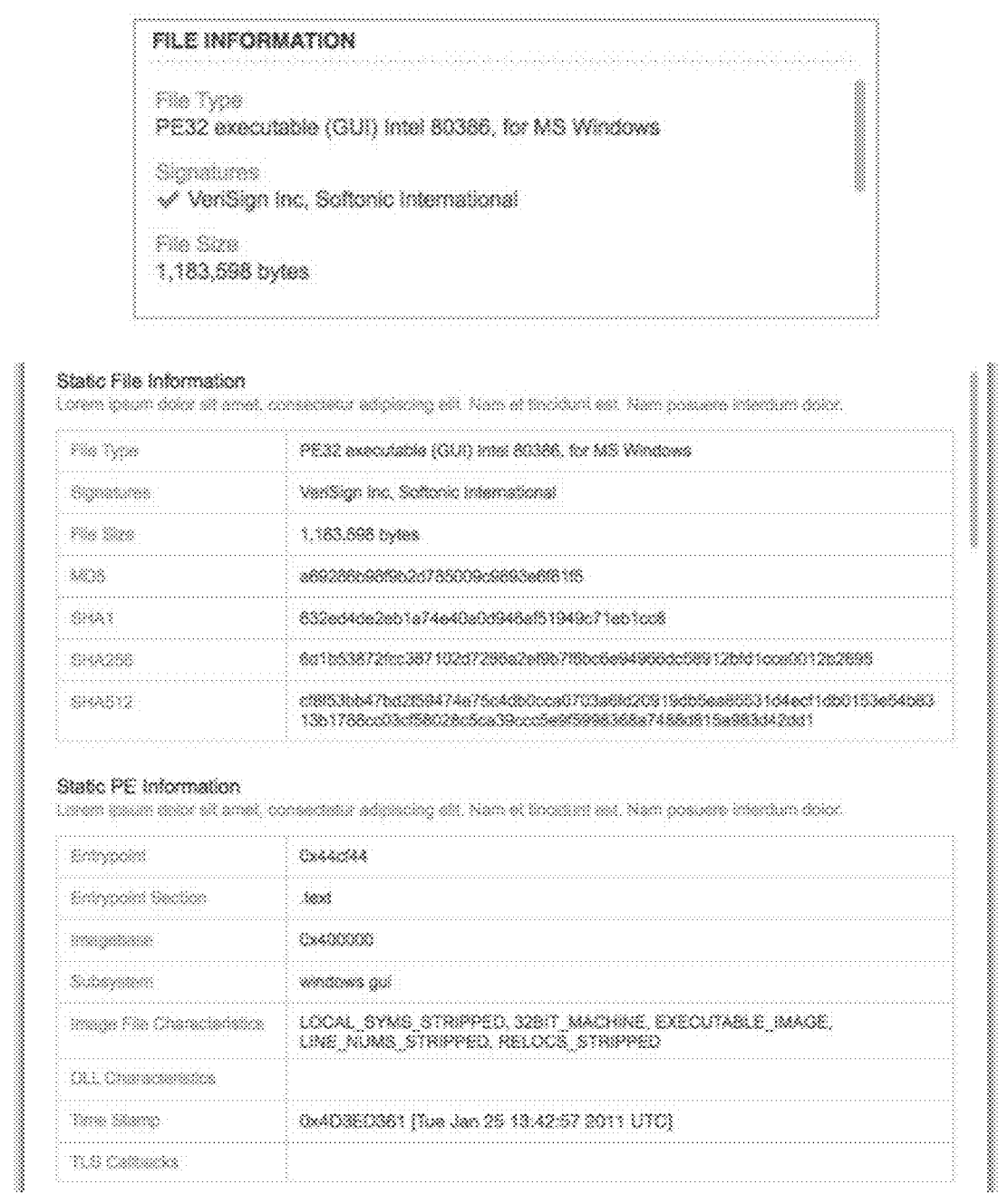

FIG. 17 is screenshots of expanded views of classification information from the exemplary BA report. The Classification block shows information describing the overall classification of the analyzed file based on the file score. The overall classification (malicious, suspicious or benign) is accompanied by a score in the range 0-100. Non-benign files will also have a threat category (such as Malware, Adware, etc.) and may have an associated threat name. The expanded view adds descriptive text for each classification parameter and a link to the threat library for the threat name. FIG. 18 is screenshots of expanded views of file information from the exemplary BA report. The File Information block shows a set of properties identified for the analyzed file. Only the most important properties are displayed in the compact view. The expanded view adds descriptive text for the block as a whole as well as for each category of file properties. All file properties are displayed in the expanded view and grouped into several categories.

Figure 19:
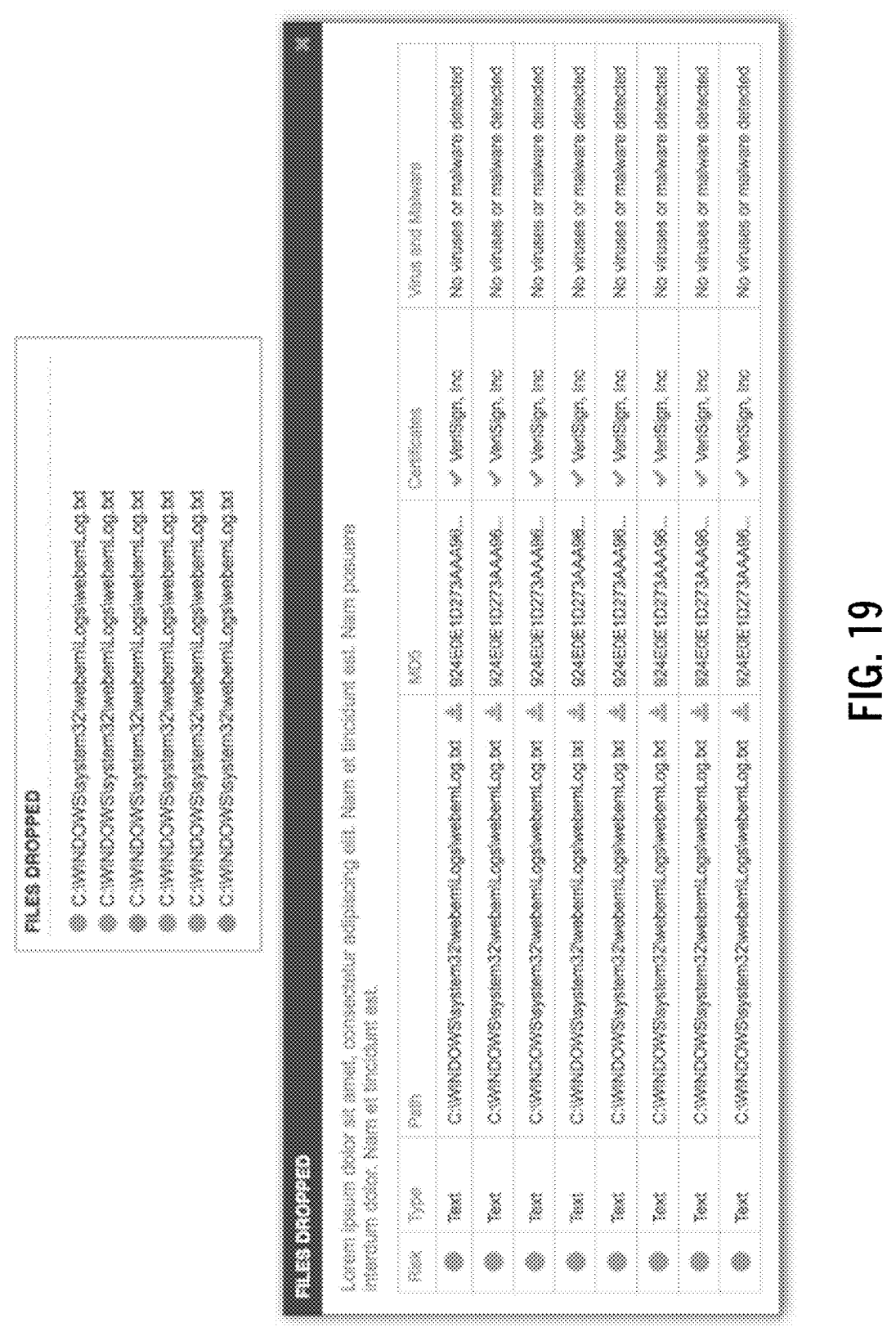

FIG. 19 is screenshots of expanded views of files dropped information from the exemplary BA report. The Files Dropped block shows a severity indicator icon and full path for each dropped file. Since there may be a large amount of data it is recommended that a subset of rows are initially loaded with remaining rows loaded when the user scrolls past initial data. The expanded view adds descriptive text for the block and displays a table of files with additional information. An icon link is provided to download individual dropped files. FIG. 20 is screenshots of expanded views of origin information from the exemplary BA report. The Origin block shows a series of images and information for each possible origin. Icons are provided for navigating between the origins. The expanded view adds descriptive text for the block and displays all origins simultaneously.

Figure 22:
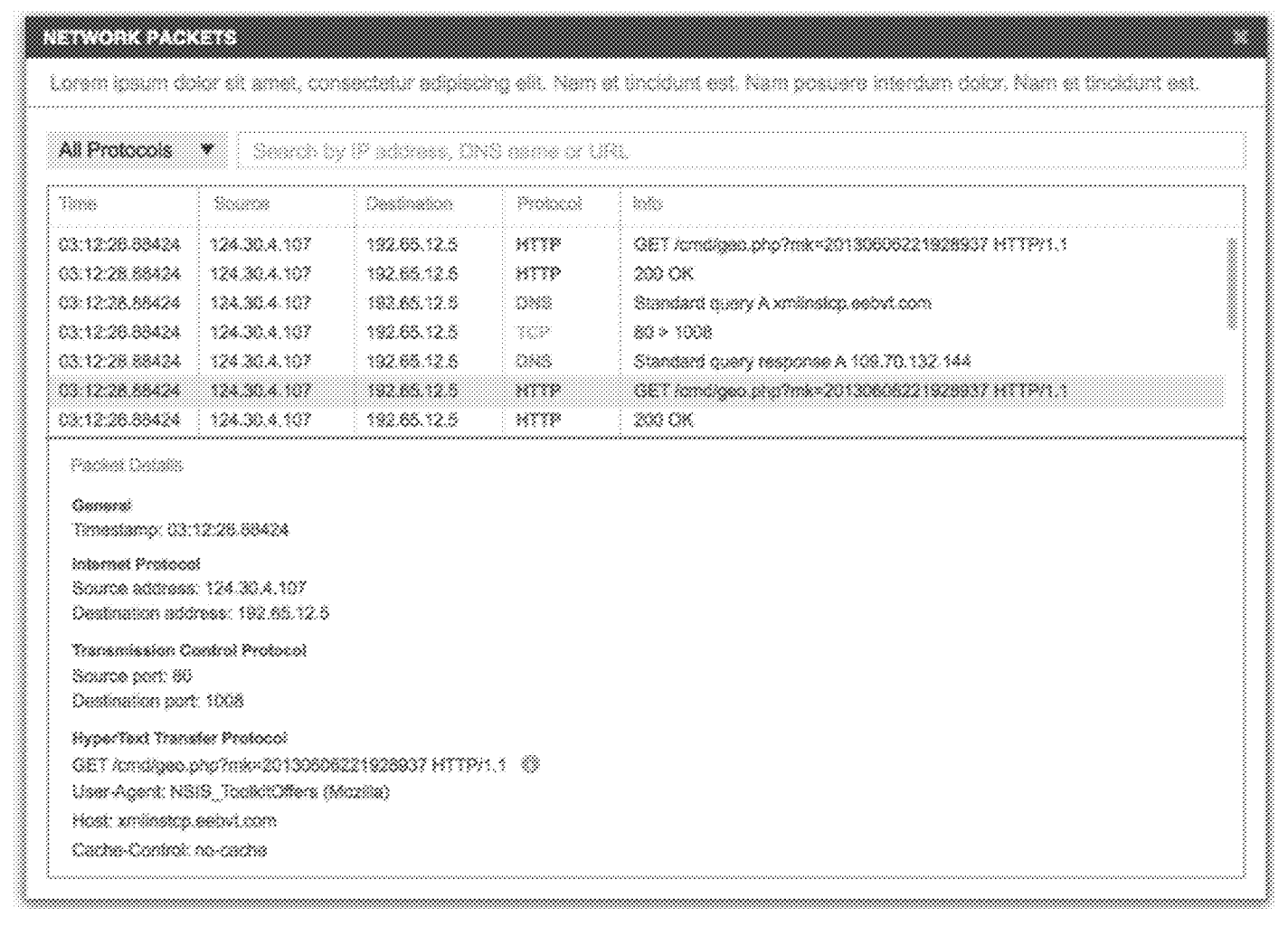

FIGS. 21-22 are screenshots of expanded views of network packets information from the exemplary BA report. The Network Packets block shows a list of packets sent over the network by the file under analysis. A selector is provided at the top in order to filter by protocol (e.g., DNS, HTTP, TCP, UDP, ICMP, IRC, SMTP, etc.). Since there may be a large amount of data it is recommended that a subset of rows are initially loaded with remaining rows loaded when the user scrolls past initial data. The expanded view adds descriptive text for the block, a table showing additional information in its columns and a detail area for the selected packet with all available information for that packet. A search field is also provided which will cause the table to show only packets having IP address, DNS name or URL matching the search string. An information icon link is provided for each URL, opening a new browser tab showing information for the URL.

Figure 23:
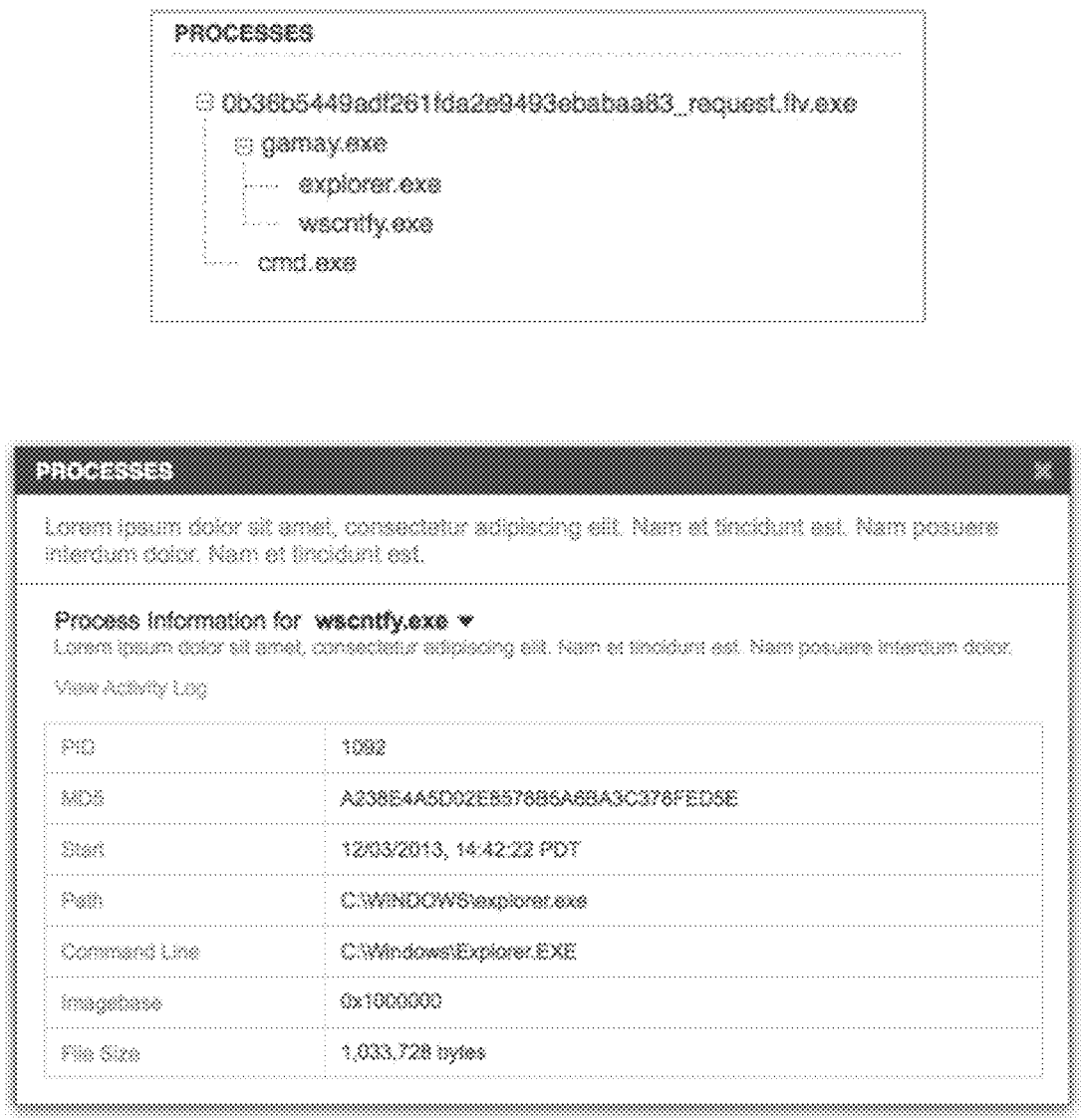
FIG. 23 is screenshots of expanded views of processes information from the exemplary BA report of FIGS. 11-12.
Figure 24:
FIGS. 24-25 are screenshots of expanded views of screenshots from the exemplary BA report of FIGS. 11-12.
Figure 25:
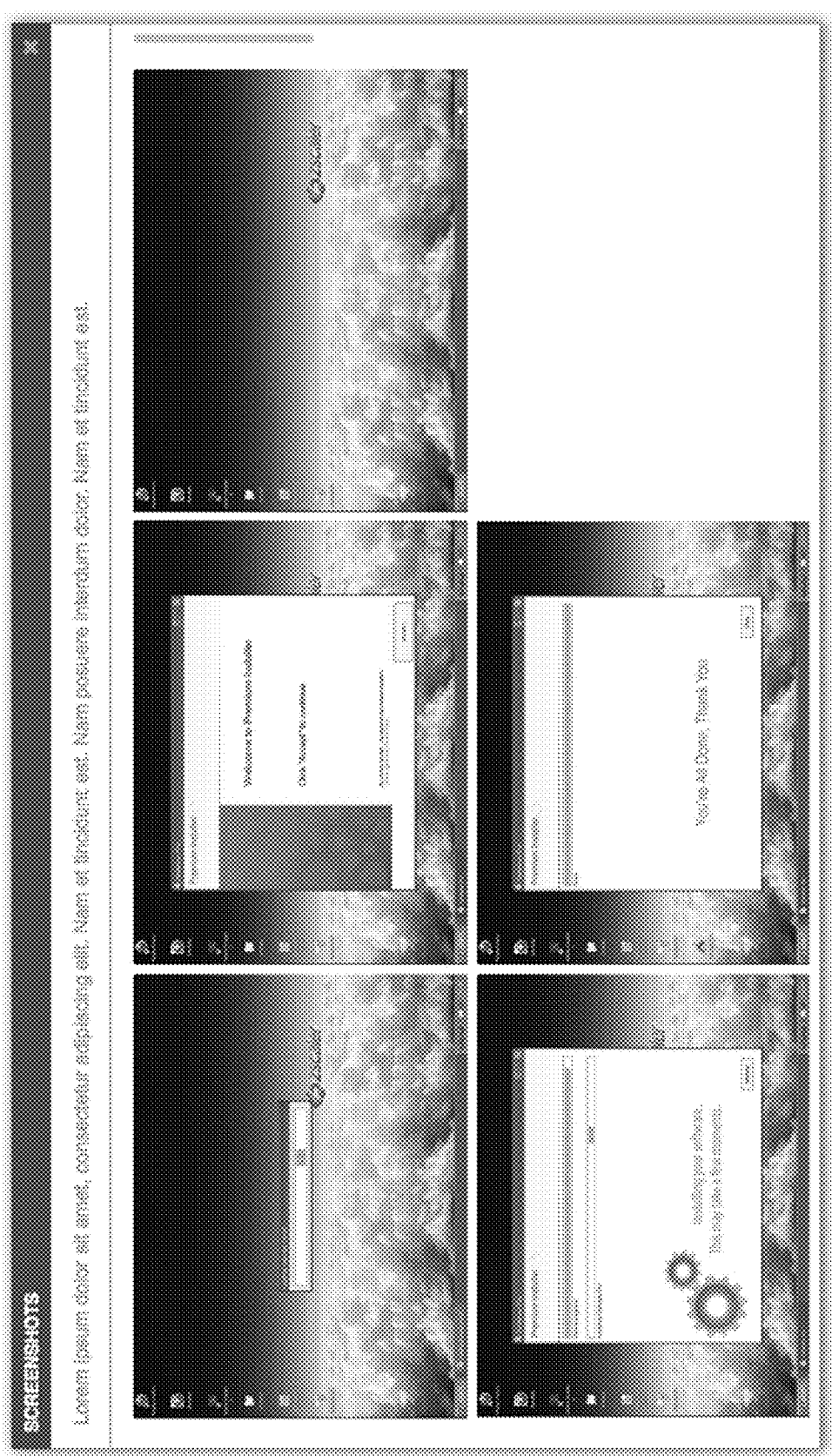

FIG. 23 is screenshots of expanded views of processes information from the exemplary BA report. The Processes block shows a tree of the processes identified during file analysis. The expanded view adds descriptive text for the block and a table of properties for the selected process. A dropdown with a tree structure of processes may be used to select the process for which properties are displayed. A link is provided which will open the expanded Activity block showing activities for the selected process. FIGS. 24-25 are screenshots of expanded views of screenshots from the exemplary BA report. The Screenshots block shows a series of small screenshot images. Icons are provided for navigating between the screenshots. Since there may be a large amount of data it is recommended that a subset of images are initially loaded with remaining images loaded when the user navigates past initial data. The expanded view adds descriptive text for the block and displays all screenshot images at once. Clicking on a screenshot will show the full size image.

Figure 26:
FIG. 26 is screenshots of expanded views of string analysis information from the exemplary BA report of FIGS. 11-12.
Figure 27:
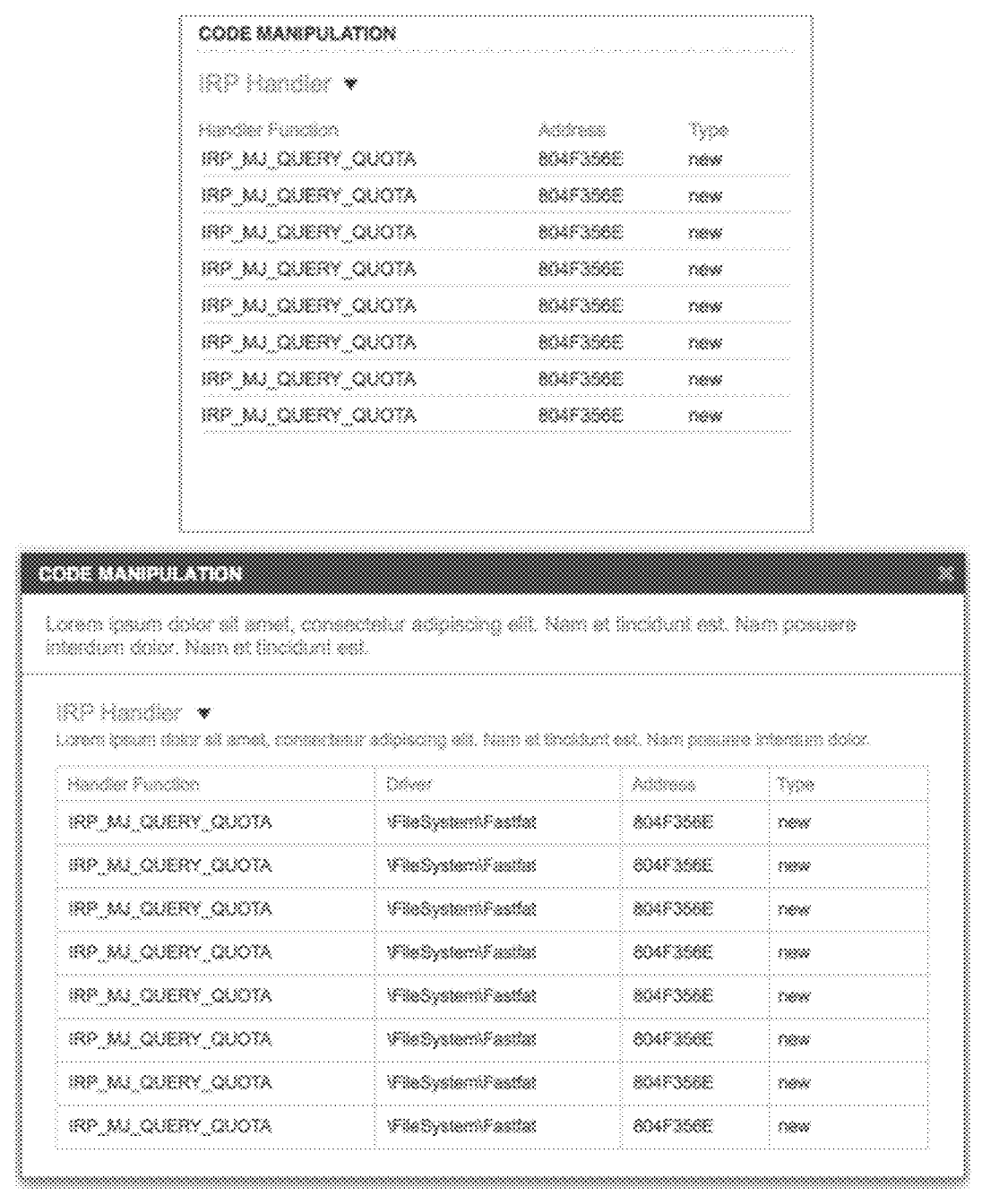
Figure 28:
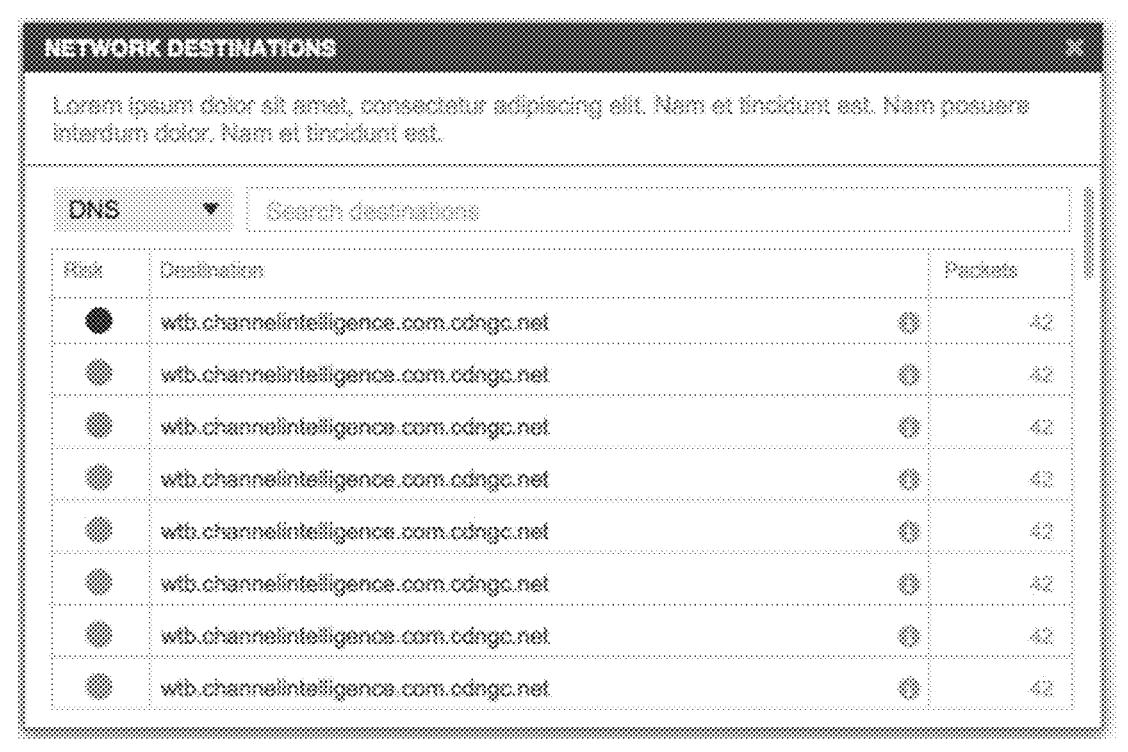

FIG. 26 is screenshots of expanded views of string analysis information from the exemplary BA report. The String Analysis block shows a list of strings identified in the file under analysis. A dropdown is provided in order to select the category of strings to view (URLs, Social Networking, Financial Institutions). Since there may be a large amount of data it is recommended that a subset of rows are initially loaded with remaining rows loaded when the user scrolls past initial data. The expanded view adds descriptive text for the block as well as the source for each string. A search function is also provided, which will filter the table contents to only show strings matching the search string. FIG. 27 is screenshots of expanded views of code manipulation information from the exemplary BA report. FIG. 28 is a screenshot of expanded views of network destination information from the exemplary BA report.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A zero day/zero hour malware detection method implemented by a processor in a behavior analysis system, the malware detection method comprising:
  receiving unknown content at a server in the behavior analysis system from a distributed security system based on inline monitoring of a plurality of users with the distributed security system which is a cloud-based system;
  performing malware detection through the server by:
    securely storing the unknown content in a Secure Storage Engine (SSE);
    performing a static analysis of the unknown content to determine properties of the unknown content using a set of tools based on a type of file of the unknown content and securely storing static results in the SSE, wherein the set of tools comprise checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis;
    sending the unknown content to a behavior analysis controller which is connected to a sandbox which performs a dynamic analysis based on scheduling by the behavior analysis controller, wherein the sandbox is a virtual machine where the unknown content is executed in a controller manner where the sandbox is controlled by the behavior analysis controller to perform the dynamic analysis;

receiving dynamic results from the dynamic analysis and storing the dynamic results in the SSE;

determining if the unknown content is malware based on a combination of the static results and the dynamic results; and subsequent to the malware detection, updating the distributed security system with a malware signature of the unknown content if the unknown content is malware.

2. The malware detection method of claim 1, wherein the sandbox utilizes an operating system based on a type of file of the unknown content.

3. The malware detection method of claim 1, wherein the dynamic analysis determines file system changes and network activity caused by execution of the unknown content.

4. The malware detection method of claim 1, wherein the distributed security system is configured to monitor traffic using Hypertext Transfer Protocol (HTTP) and non-HTTP protocols from the plurality of users, and wherein the distributed security system is external from the plurality of users.

5. The malware detection method of claim 1, wherein the distributed security system is configured to update all nodes with the malware signature of the unknown content subsequent to the updating.

6. The malware detection method of claim 1, wherein, subsequent to receiving the unknown content and prior to sending the unknown content to the sandbox, the method further comprising:

queuing the unknown content and scheduling the dynamic analysis based on priority of the unknown content with known viruses getting lower priority.

7. The malware detection method of claim 1, wherein the SSE comprises an activity ledger recording events associated with the unknown content in the behavior analysis system, and wherein the activity ledger is utilized in the malware detection.

8. The malware detection method of claim 1, wherein the behavior analysis controller performs the dynamic analysis through steps of sending the unknown content to the sandbox based on a specific operating system type;

evaluating file system changes, network activity, and pertinent results to derive the dynamic results; and cleaning up temporary files generated by the unknown content.

9. A zero day/zero hour malware detection system, comprising:

a network interface;

a processor communicatively coupled to the network interface; and memory storing instructions that, when executed, cause the processor to receive unknown content from a distributed security system via the network interface based on inline monitoring of a plurality of users with the distributed security system which is a cloud-based system;

perform malware detection on the unknown content through instructions that, when executed, cause the processor to:

securely store the unknown content in a Secure Storage Engine (SSE);

perform a static analysis of the unknown content to determine properties of the unknown content using a set of tools based on a type of file of the unknown content and securely store static results in the SSE, wherein the set of tools comprise checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis;

send the unknown content to a behavior analysis controller which is connected to a which performs a dynamic analysis based on scheduling by the behavior analysis controller, wherein the sandbox is a virtual machine where the unknown content is executed in a controller manner where the sandbox is controlled by the behavior analysis controller to perform the dynamic analysis;

receive dynamic results from the dynamic analysis and store the dynamic results in the SSE;

determine if the unknown content is malware based on a combination of the static results and the dynamic results from the dynamic analysis and a static analysis; and subsequent to the malware detection, update the distributed security system via the network interface with a malware signature of the unknown content if the unknown content is malware.

10. The malware detection system of claim 9, wherein the sandbox utilizes an operating system based on a type of file of the unknown content.

11. The malware detection system of claim 9, wherein the dynamic analysis determines file system changes and network activity caused by execution of the unknown content.

12. The malware detection system of claim 9, wherein the distributed security system is configured to monitor traffic using Hypertext Transfer Protocol (HTTP) and non-HTTP protocols from the plurality of users, and wherein the distributed security system is external from the plurality of users.

13. The malware detection system of claim 9, wherein the distributed security system is configured to update all nodes with the malware signature of the unknown content subsequent to the updating.

14. The malware detection system of claim 9, wherein, subsequent to receipt of the unknown content and prior the unknown content being sent to the sandbox, the memory storing instructions that, when executed, further cause the processor to queue the unknown content and scheduling the dynamic analysis based on priority of the unknown content with known viruses getting lower priority.

15. A distributed security system, comprising:

a plurality of nodes inline monitoring traffic associated with a plurality of users and which are geographical distributed to monitor the users independent of their location; and a malware detection server comprising a network interface, a processor communicatively coupled to the network interface, and memory storing instructions that, when executed, causes the processor to receive unknown content from a node of the plurality of nodes via the network interface based on the monitoring traffic;

store the securely store the unknown content in a Secure Storage Engine (SSE);

perform a static analysis of the unknown content to determine properties of the unknown content using a set of tools based on a type of file of the unknown content and securely store static results in the SSE, wherein the set of tools comprise checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis;

perform malware detection on the unknown content through instructions that, when executed, cause the processor to:

send the unknown content to a behavior analysis controller which is connected to a sandbox which performs a dynamic analysis, wherein the sandbox is a virtual machine where the unknown content is executed in a controller manner where the sandbox is controlled by the behavior analysis controller to perform the dynamic analysis;

receive dynamic data from the dynamic analysis and store the dynamic data in the SSE;

determine if the unknown content is malware based on a combination of the static results and the dynamic results; and subsequent to the malware detection, update the plurality of nodes via the network interface with a malware signature of the unknown content if the unknown content is malware.

16. The distributed security system of claim 15, wherein the plurality of nodes are geographically distributed and located in the cloud relative to the plurality of users, and wherein the plurality of the users is external to the distributed security system.

* * * * *